US007843378B2

(12) United States Patent
Venkatachalam et al.

(10) Patent No.: US 7,843,378 B2
(45) Date of Patent: Nov. 30, 2010

(54) DYNAMIC AND ADAPTIVE RADAR TRACKING OF STORMS (DARTS)

(75) Inventors: Chandrasekaran Venkatachalam, Fort Collins, CO (US); Gang Xu, Houston, TX (US); Yanting Wang, Aurora, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 299 days.

(21) Appl. No.: 12/074,511

(22) Filed: Mar. 4, 2008

(65) Prior Publication Data

US 2009/0224965 A1    Sep. 10, 2009

(51) Int. Cl.
G01S 13/95    (2006.01)
(52) U.S. Cl. .................... 342/26 R; 342/26 D; 342/196
(58) Field of Classification Search ............... 342/26 R, 342/26 A–26 D, 192, 195, 196
See application file for complete search history.

(56) References Cited

U.S. PATENT DOCUMENTS

| | | | | |
|---|---|---|---|---|
| 7,583,222 | B2 * | 9/2009 | O'Hora et al. ............ | 342/26 R |
| 7,652,614 | B2 * | 1/2010 | Venkatachalam et al. . | 342/26 R |
| 2002/0126039 | A1 * | 9/2002 | Dalton et al. ................. | 342/26 |
| 2005/0234349 | A1 * | 10/2005 | Pravica et al. ............... | 600/481 |
| 2008/0012755 | A1 * | 1/2008 | Venkatachalam et al. . | 342/26 R |
| 2009/0033542 | A1 * | 2/2009 | Venkatachalam et al. ..... | 342/73 |
| 2009/0224965 | A1 * | 9/2009 | Venkatachalam et al. . | 342/26 R |
| 2009/0295627 | A1 * | 12/2009 | Venkatachalam et al. . | 342/26 R |

OTHER PUBLICATIONS

Xu, Gang et al., Poster for "Radar Storm Motion Estimation And Beyond: A Spectral Algorithm And Radar Observation Based Dynamic Model," Colorado State University, 1 page, no date.
Xu, G. et al., "Radar Storm Motion Estimation And Beyond: A Spectral Algorithm And Radar Observation Based Dynamic Model," WWRP International Symposium on Nowcasting and Very Short Range Forecasting, 2 pages, no date.
International Application No. PCT/US2009/035953, International Search Report and Written Opinion, 10 pages, Jul. 15, 2009.
Sakaino, Hidetomo, "A Unified Prediction Method for Heterogeneous Weather Radar Patterns," Proceedings of the $6^{th}$ IEEE Workshop on Applications of Computer Vision (WACV'02), 8 pages, 2002.
Xu, Gang et al., "Statistical Modeling For Spatiotemporal Radar Observations And Its Applications To Nowcasting," International Geoscience and Remote Sensing Symposium, 4 pages, Jul. 1, 2006.
Anonymous, WSN05 List Of Communications, http://web.archive.org/web/2006004120535/www.meteo. fr/cic/wsn05/DVD/abstracts_list_nom.html, 28 pages, Oct. 4, 2006.

* cited by examiner

*Primary Examiner*—John B Sotomayor
(74) *Attorney, Agent, or Firm*—Townsend and Townsend and Crew LLP

(57) ABSTRACT

Methods and systems for estimating atmospheric conditions are disclosed according to embodiments of the invention. In one embodiment, a method may include receiving reflective atmospheric data and solving a flow equation for motion coefficients using the reflective atmospheric data. Future atmospheric conditions can be estimated using the motion coefficients and the reflective atmospheric data. In another embodiment of the invention, the flow equation is solved in the frequency domain. Various linear regression tools may be used to solve for the coefficients. In another embodiment of the system, a radar system is disclosed that predicts future atmospheric conditions by solving the spectral flow equation.

12 Claims, 22 Drawing Sheets
(5 of 22 Drawing Sheet(s) Filed in Color)

DYNAMIC AND ADAPTIVE RADAR TRACKING OF STORMS (DARTS)

STATEMENT AS TO RIGHTS TO INVENTIONS MADE UNDER FEDERALLY SPONSORED RESEARCH AND DEVELOPMENT

This invention was made with Government support through Engineering Research Centers programs under NSF Cooperation Programs No. ERC-0313747.

BACKGROUND OF THE INVENTION

This disclosure relates in general to weather forecasting and, but not by way of limitation, to weather nowcasting by estimating storm motion amongst other things.

The prediction of thunderstorms has been an active and flourishing modern discipline, especially due to the advent of various new technologies including the scanning Doppler weather radar. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

The maximum range of weather radar is usually more than 150 km, while the minimum resolved scale can be 100 to 200 m. The radar observations can be updated in a few minutes. Weather radar has become one of the primary tools for monitoring and forecasting the severe storms that may extend tens to hundreds of kilometers, yet whose scale is still relatively small compared to the synoptic scale of the earth. Many high impact and severe weather phenomena are the meso-scale or the storm-scale systems, having the lifetime from a few tens of minutes to a few hours. So the very short term forecasting of thunderstorms is particularly important to various end users, such as the airport transportation, the highway traffic, the construction industry, the outdoor sporting and entertainment, the public safety management, resource (e.g., agriculture and forest) protection and management. The forecast of such type is termed as the nowcasting, which can be defined as the forecasting of thunderstorms for a very short time periods that are less than a few hours, for example, up to twelve hours.

Many systems predict thunderstorms in the short term using tracking and extrapolation of radar echoes. Some techniques track storms using distributed "motion-field" based storm trackers, another is the "centroid" storm cell tracker. Beyond these techniques, many statistical and numerical models have been used. Despite the litany of research in this area, there remains a need in the art for improved nowcasting techniques.

BRIEF SUMMARY OF THE INVENTION

A method for predicting atmospheric conditions is provided according to one embodiment of the invention. The method includes solving a flow equation for motion coefficients using the reflective atmospheric data and predicting future atmospheric conditions using the motion coefficients and the reflective atmospheric data. The reflective atmospheric data comprises a time series of sequential radar images. The flow equation may be solved in the spectral domain using Fast Fourier Transforms. The method may further include estimating future atmospheric conditions by applying the motion coefficients to the received reflective atmospheric data. The flow equation may comprise:

$$\frac{\partial}{\partial t}F(x, y, t) = -U(x, y)\frac{\partial}{\partial x}F(x, y, t) - \frac{\partial}{\partial y}V(x, y)F(x, y, t) + S(x, y, t).$$

In another embodiment of the invention, the flow equation may be written in the frequency domain and may comprise:

$$k_t F_{DFT}(k_x, k_y, k_t) =$$

$$-\left[\frac{1}{N_x N_y}\right]\sum_{k_x=N_x^-}^{N_x^+}\sum_{k_y=N_y^-}^{N_y^+}\left[\frac{U_{DFT}(k_x', k_y')}{T_x/T_t}\right](k_x - k_x')DFT(k_x - k_x', k_y - k_y', k_t) -$$

$$\left[\frac{1}{N_x N_y}\right]\sum_{k_x=N_x^-}^{N_x^+}\sum_{k_y=N_y^-}^{N_y^+}\left[\frac{V_{DFT}(k_x', k_y')}{T_y/T_t}\right](k_y - k_y')DFT(k_x - k_x', k_y - k_y', k_t) -$$

$$\left(\frac{i}{2\pi}\right)[T_t \cdot S_{DFT}(k_x, k_y, k_t)].$$

A method for predicting a storm motion field is disclosed according to another embodiment of the invention. The method includes propagating a radar signal to the region of interest and collecting sampled time domain radar data scattered within the region of interest. This radar data may then be converted into the frequency domain. Motion coefficients may be solved for a frequency domain flow equation using the reflective atmospheric data. Using these motion coefficients, future atmospheric conditions may be predicted. These predicted conditions may be returned. The future atmospheric conditions may be estimated by applying the motion coefficients to the received reflective atmospheric data. The estimating further comprises using a least squares error algorithm.

A radar system for nowcasting weather patterns within a region of interest is also disclosed according to one embodiment of the invention. The system may include a radar source configured to propagate a radar signal, a radar detector configured to collect radar data, and a computational system in communication with the radar source and with the radar detector. The computational system may include a processor and a memory coupled with the processor. The memory comprises a computer-readable medium having a computer-readable program embodied therein for direction operation of the radar system to investigate the region of interest. The computer-readable program may include instructions for propagating the radar signal into the region of interest with the radar source and collecting sampled time domain radar data scattered within the region of interest with the radar detector. The computer-readable program may also include instructions for converting the time domain radar data into frequency domain data and instructions for solving a frequency domain flow equation for motion coefficients using the reflective atmospheric data. The computer-readable program may further include instructions for predicting future atmospheric conditions using the motion coefficients and the reflective atmospheric data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
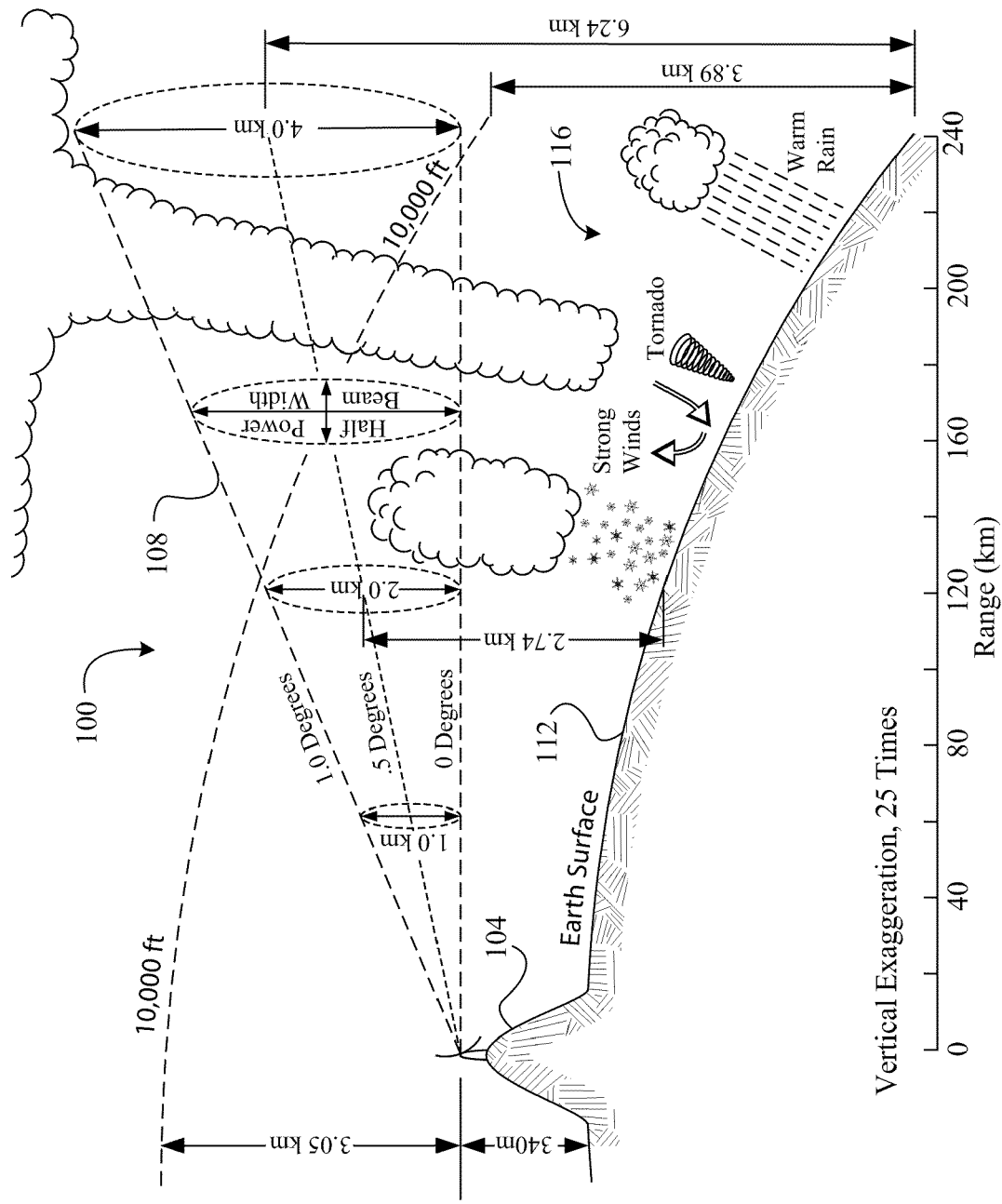
FIG. 1 shows a schematic illustration of the operation of a conventional radar system (reproduced from the National Academy of Sciences Report, "Flash flood forecasting over complex terrain").

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

In one embodiment, the present disclosure provides for a novel method and/or system for estimating the distributed motion field of the storm. According to embodiments of the invention, storm estimation occurs within the spectral domain and may be built upon the general flow equation in a modified form for storm motion tracking. Embodiments of the invention may also employ a linear model that can separate the storm motion from local and additive growth decay mechanisms. Using the spectral domain to estimate the motion field may control various scales of both storm and motion field by the choice of Fourier coefficients.

Another embodiment of the invention employs a global algorithm to estimate a motion field in the sense that the algorithm does not employ local block windows in radar images. Accordingly, the estimated motion field can be globally constructed over the whole spatial region where radar images are rendered. The smoothness of the estimated motion field may be controlled by selecting fewer leading Fourier coefficients. Various embodiments of the invention formulate and/or solve the motion flow equation for radar images in Fourier space. The model parameters in the Fourier space may be estimated by a linear Least-Square-Estimation (LSE) or other linear regression tools. The Fast Fourier Transform (FFT) and the linear LSE algorithm can be easy to implement and the numerical computation may be fast.

A general motion flow equation for the radar observation field F(x, y, t) can be written as $$\frac{\partial}{\partial t} F(x, y, t) = \qquad \text{eq. 1}$$
$$-U(x, y)\frac{\partial}{\partial x} F(x, y, t) - \frac{\partial}{\partial y} V(x, y) F(x, y, t) + S(x, y, t),$$

where F(x, y, t) is the scalar field of radar observation that is modeled as a spatiotemporal process. U(x, y) is the x-axis motion velocity and V(x, y) is the y-axis motion velocity over the spatial domain. S(x, y, t), the "S-term", is generally interpreted as other dynamic mechanisms, for example, the growth or decay term. The flow equation in equation 1 is expressed in the Euler space, in which the radar observational field F(x, y, t) can be conveniently represented.

The discrete version of F(x, y, t) may be written as F(i, j, k). The differential equation (equation 1) can be rewritten in the frequency domain, in the discrete form as $$k_t F_{DFT}(k_x, k_y, k_t) = \qquad \text{eq. 2}$$
$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right](k_x - k_x') DFT$$
$$(k_x - k_x', k_y - k_y', k_t) - \left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right]$$
$$(k_y - k_y') DFT(k_x - k_x', k_y - k_y', k_t) -$$
$$\left(\frac{i}{2\pi}\right)[T_t \cdot S_{DFT}(k_x, k_y, k_t)];$$

where $F_{DFT}$ includes the 3D Discrete Fourier Transform (DFT) coefficients of the observed radar field F(i, j, k), which are discrete space-time observations. $U_{DFT}$ includes the 2D DFT coefficients of U(i, j), $V_{DFT}$ include the 2D DFT coefficients of V(i, j) and $S_{DFT}$ include the 3D DFT coefficients of S(i, j, k), which are unknowns to be estimated. It should be noted that, equation 2 provides a linear inversion problem when the $F_{DFT}$ coefficients are known, so as to estimate $U_{DFT}$, $V_{DFT}$ and $F_{DFT}$. By choosing fewer leading coefficients among the coefficients of $U_{DFT}$, $V_{DFT}$ and $S_{DFT}$, equation 2 may form an over-determined linear system that can be solved, for example, using a linear least squares estimation method. In equation 2, various scales of the storm can be controlled by choosing the desired leading coefficients among $F_{DFT}$, provided that the resulting equation forms an over-determined linear system. This can generally be achieved when the motion field ($U_{DFT}$ and $V_{DFT}$) and the S-term ($S_{DFT}$) have much fewer leading coefficients than the radar field ($F_{DFT}$).

Although equation 1 may provide a conceptually simple model, it may also offer several advantages when combined with the spectral algorithm of equation 2. For example, the model given by equation 1 has the potential to separate the growth and decay mechanisms from motion terms by the addition of the S-term, S(x, y, t). This may alleviate the impact of local and independent growth on motion tracking. The implication of this property of the spectral algorithm is that, by explicitly introducing other linear mechanisms in the model, the storm motion may be separated from other dynamic mechanisms.

Another exemplary feature of this model may provide for controlling the scales of the storm by the choice of DFT coefficients when solving equation 2. In some situations, it may be important for the tracking algorithm to explicitly control the scales of the storm. This controllability of scales may be an inherent functionality in this new spectral algorithm.

Another exemplary feature of the model may include formulating and/or solving for motion estimates in the spectral domain. Doing so may allow for global construction of the motion field over the whole spatial region where radar images are rendered. The issue of block window size versus the accuracy of local point estimation may be avoided and the "aperture effect" caused by the local block window may be minimized. In one embodiment of the invention, motion fields may vary slowly over the spatial domain. In such a system fewer leading Fourier coefficients can be selected to estimate and construct a smooth motion field.

Yet another exemplary feature of the model is its independence from a specific correlation model. For example, the cross-correlation technique may be used for its stable performance. However, the high computational cost of the cross-correlation method due to the searching that has to be performed to obtain the best and robust matching is well known. Accordingly, to avoid occasionally unsmoothed estimation, a heuristic hierarchical procedure from coarser scales to finer scales may be conducted. The new spectral algorithm may apply the linear inversion algorithm to the reduced set of Fourier coefficients. This algorithm has the optimal solution in a closed form and the computation of linear LSE is efficient. The new algorithm shows good performance for both synthesized reflectivity sequences and observed radar reflectivity sequences.

Figure 2:
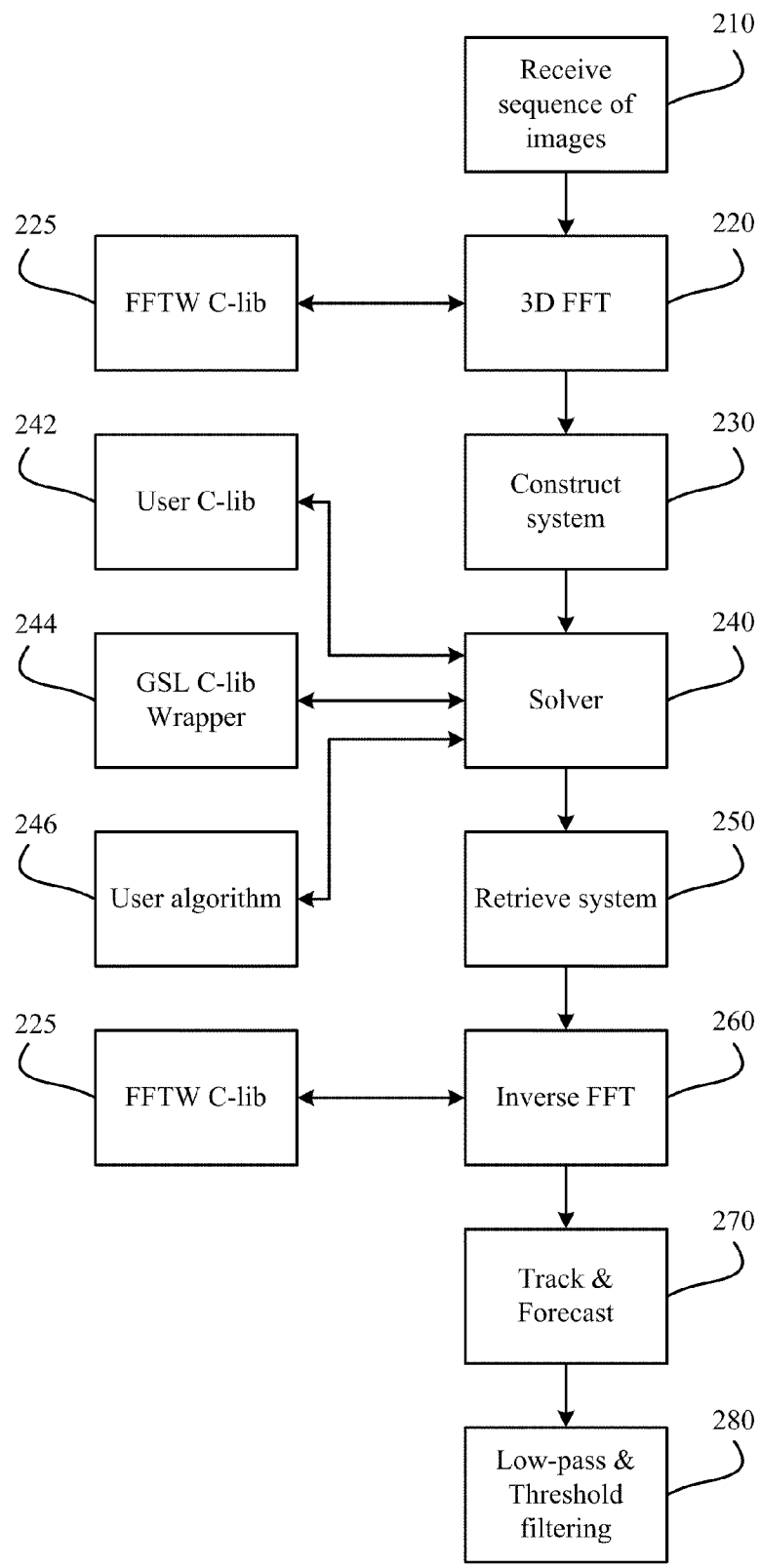
FIG. 2 shows a block diagram of an exemplary software implementation for nowcasting using a spectral algorithm according to one embodiment of the invention.

In another embodiment of the invention, a spectral algorithm, such as equation 2, may be implemented in a software library. The library may be written in any programming language, such as C, for its portability. FIG. 2 shows a block diagram for a software implementation for nowcasting using a spectral algorithm according to one embodiment of the invention. A sequence of images is received at block 210. In one embodiment, the images may be received directly from a radar or other scanning system. In another embodiment, the images may be received from storage or memory. Preprocessing may occur on the images to smooth out lines, noise, or distortions. A three-dimensional Fast Fourier Transform (FFT) is applied to the data at block 220. The FFT may be applied using a scientific library, for example, the public domain Fast Fourier Transform of the West (FFTW) library 225. Various other libraries may be use to perform the FFT. The construct system constructs the linear system at block 230. The solver 240 solves the linear equations created by the construct system 230. The solver may use any algorithm to solve the linear equations or inversion techniques. As shown, the solver may solve the linear functions using a user C library 242, a public domain library such as the GNU Scientific Library (GSL C-lib) 244, or a user provided algorithm 246. The retrieve system 250 retrieves two-dimensional discrete Fourier coefficients. An inverse FFT (IFFT) may then be applied to the retrieved data at block 260 to convert the data back into the time domain. Various features may be tracked or forecasts as provided at block 270. And, low pass and/or threshold filtering may also be provided to the data at block 280.

Figure 3:
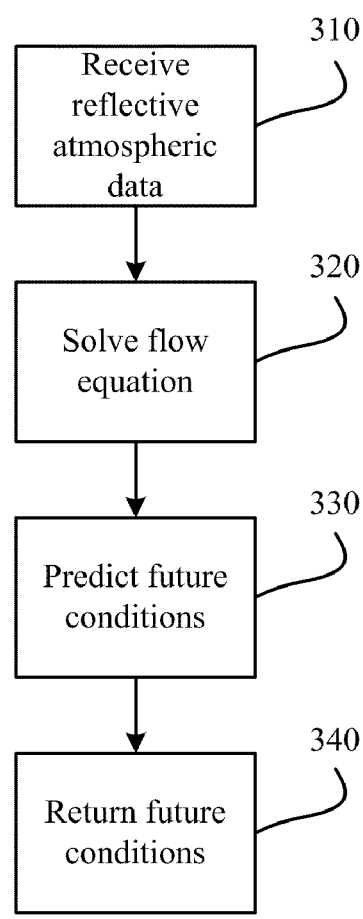
FIG. 3 shows a flowchart of a method for predicting future atmospheric conditions based on reflective atmospheric data according to one embodiment of the invention.

FIG. 3 shows a flowchart of a method for predicting future atmospheric conditions based on reflective atmospheric data according to one embodiment of the invention. Reflective atmospheric data is received at block 310. The data may be received directly from a radar system or from a storage location, such as digitally stored in memory. The flow equation is solved in block 320. The flow equation may be solved in the spectral domain. Accordingly, a FFT and IFFT may be employed to formulate and/or solve the flow equation. Future conditions may be determined based on the results from solving the flow equation at block 330. These results may then be returned to a user through a display or any other format at block 340.

Figure 4A:
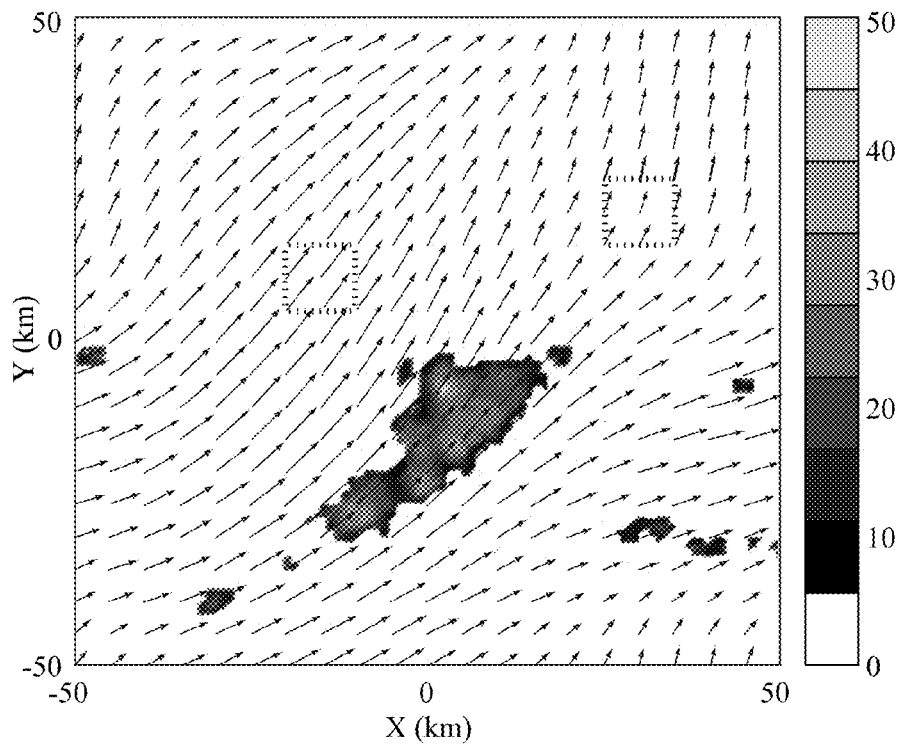
FIGS. 4A-4H show examples of images in a synthesized reflectivity sequence.
Figure 4B:
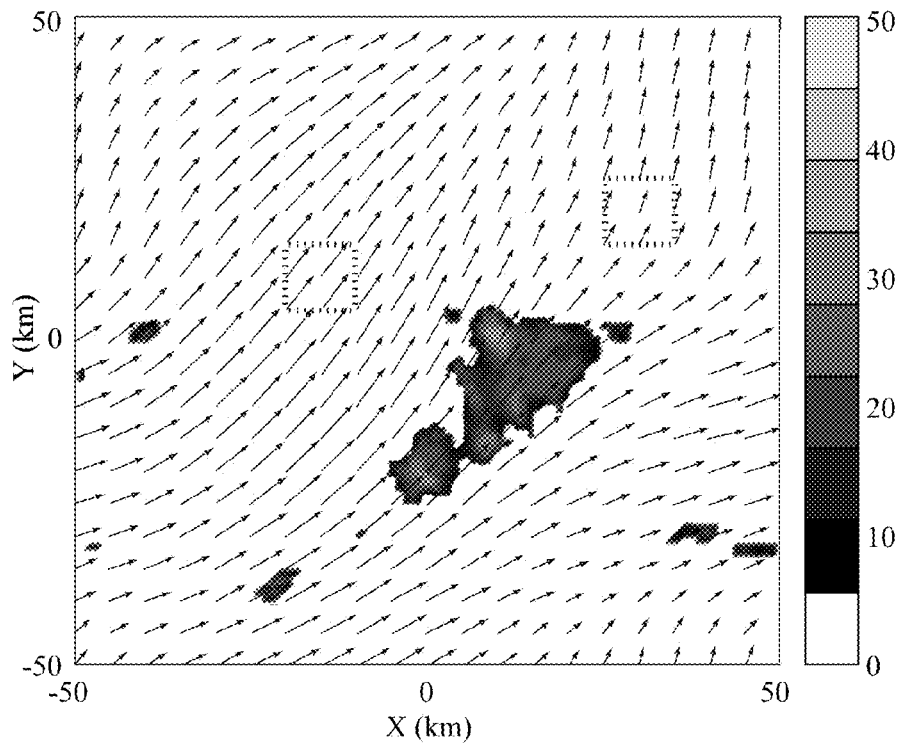
Figure 4C:
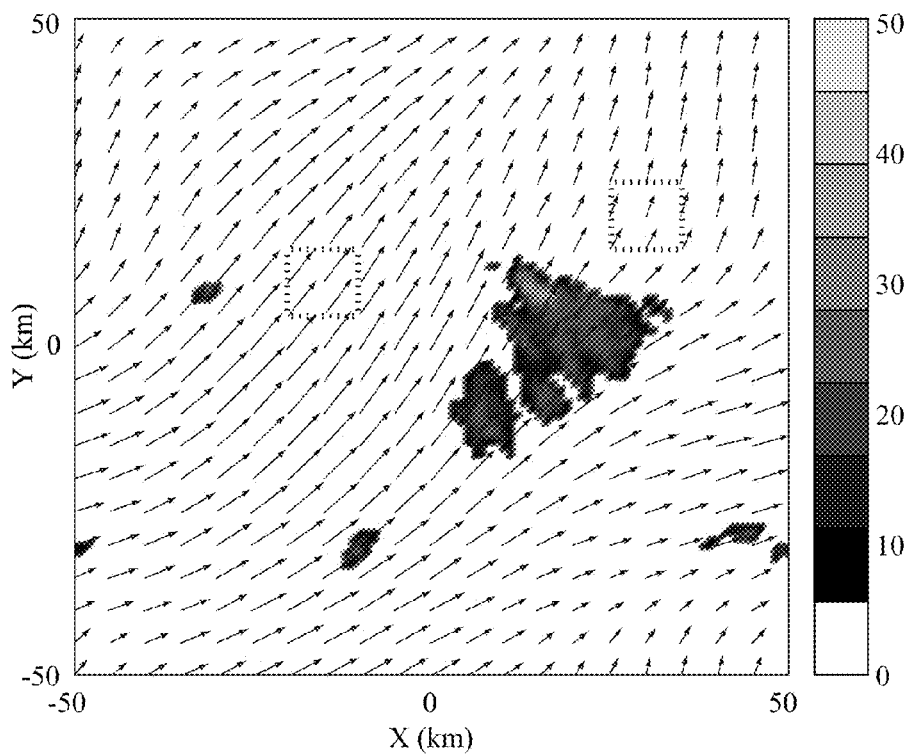
Figure 4D:
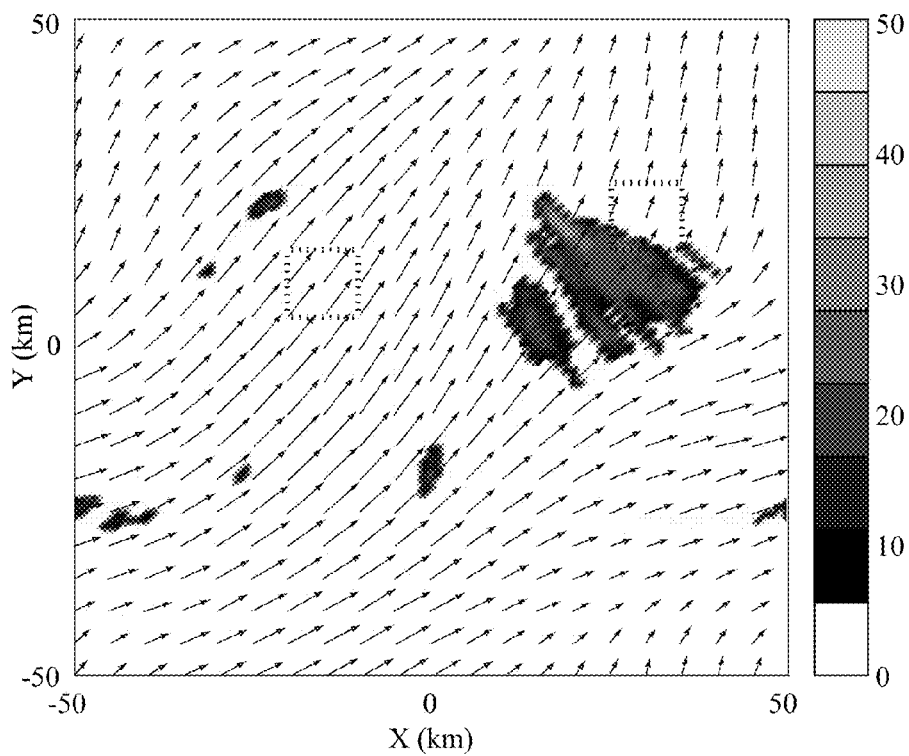
Figure 4E:
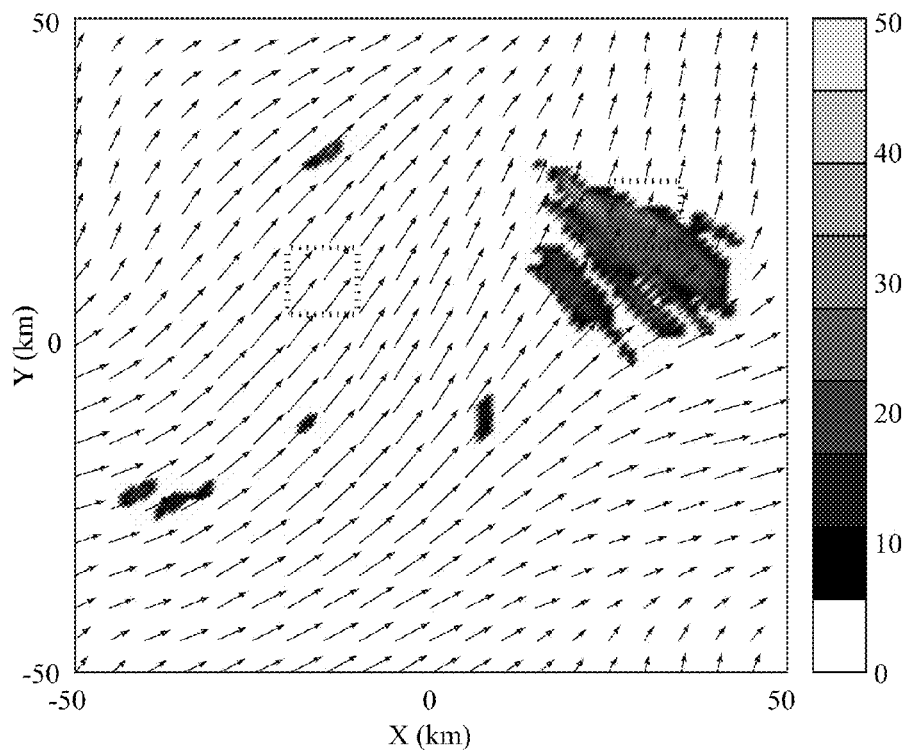
Figure 4F:
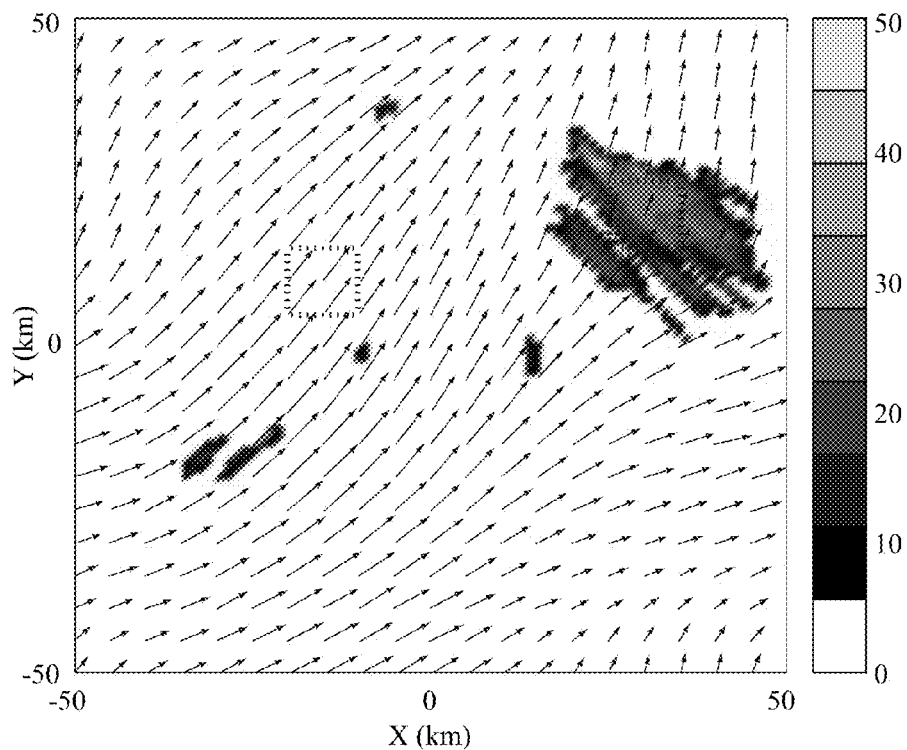
Figure 4G:
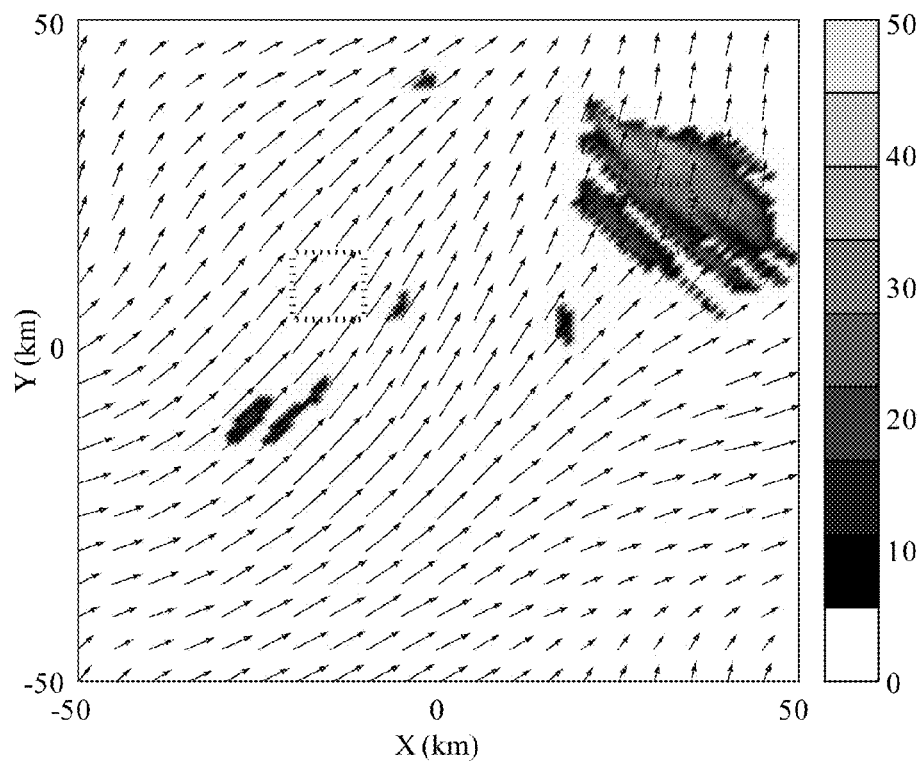
Figure 4H:
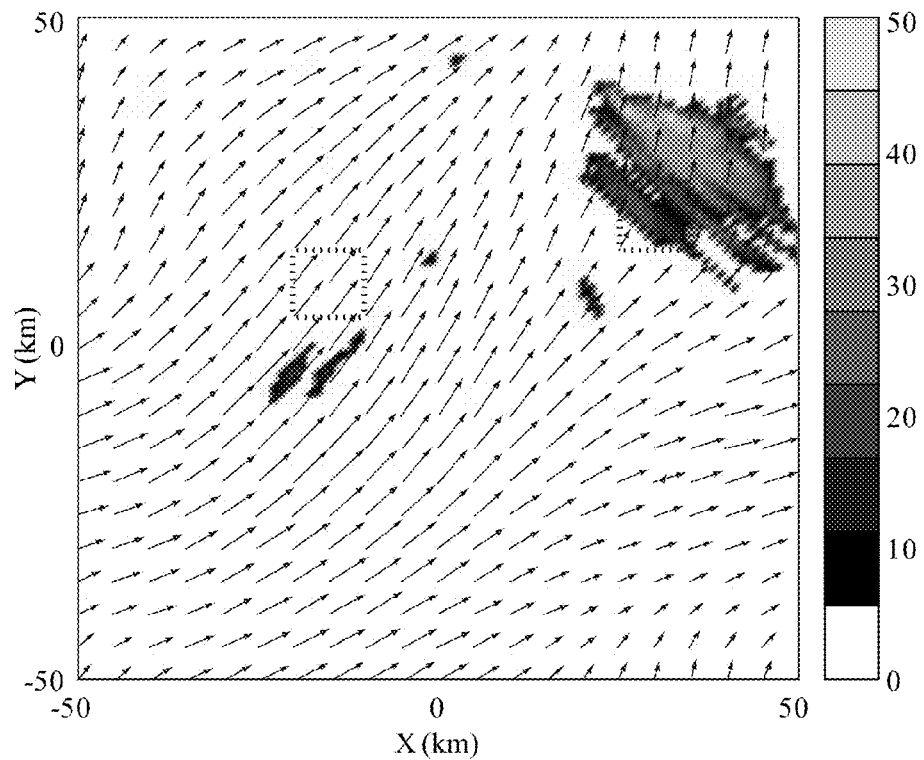

FIGS. 4A-4H show examples of images created from a first synthesized reflectivity sequence (synthesis 1) according to one embodiment of the invention. In this first synthesized reflectivity sequence, a steady motion flow field is generated over a two-dimensional region with the dimensions of −50 km$\leq$x, y$\leq$50 km. A steady motion field is a time independent flow field that does not change with time. In the first synthesized reflectivity sequence the sampling interval is 1 km on both x-axis and y-axis. FIG. 4A is used as the initial observed reflectivity (dBZ) field. A radar image sequence of 80-step span can be generated and a simple passive advection of reflectivity can be simulated for this data set. The initial reflectivity image is evolved by the advection toward the north east corner of the map using the pre-generated steady motion field as shown in FIGS. 4A-4H. The arrows in the figures display the simulated flow field. Synthesis 1 shows a reflectivity field that evolves over time. Two rectangular regions are marked in FIG. 4A. In the non-data region, the reflectivity keeps zero value in all synthesized images, so that the motion pattern never presents within this region. In contrast, as seen in FIGS. 4D-4H, the precipitation field enters and sweeps over the data region.

Figure 5:
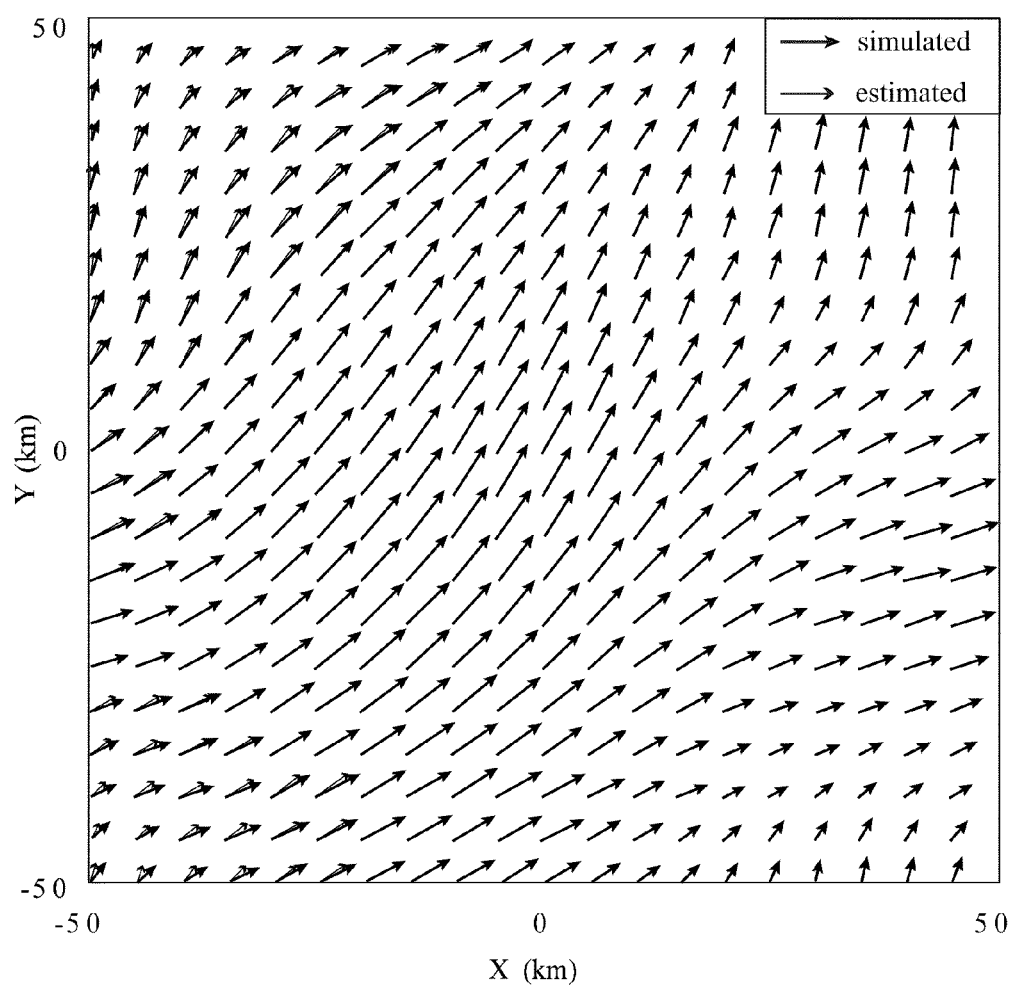
FIG. 5 shows a comparison of the true motion field (simulated) and the estimated motion field in FIGS. 4A-4H according to one embodiment of the invention.
Figure 6:
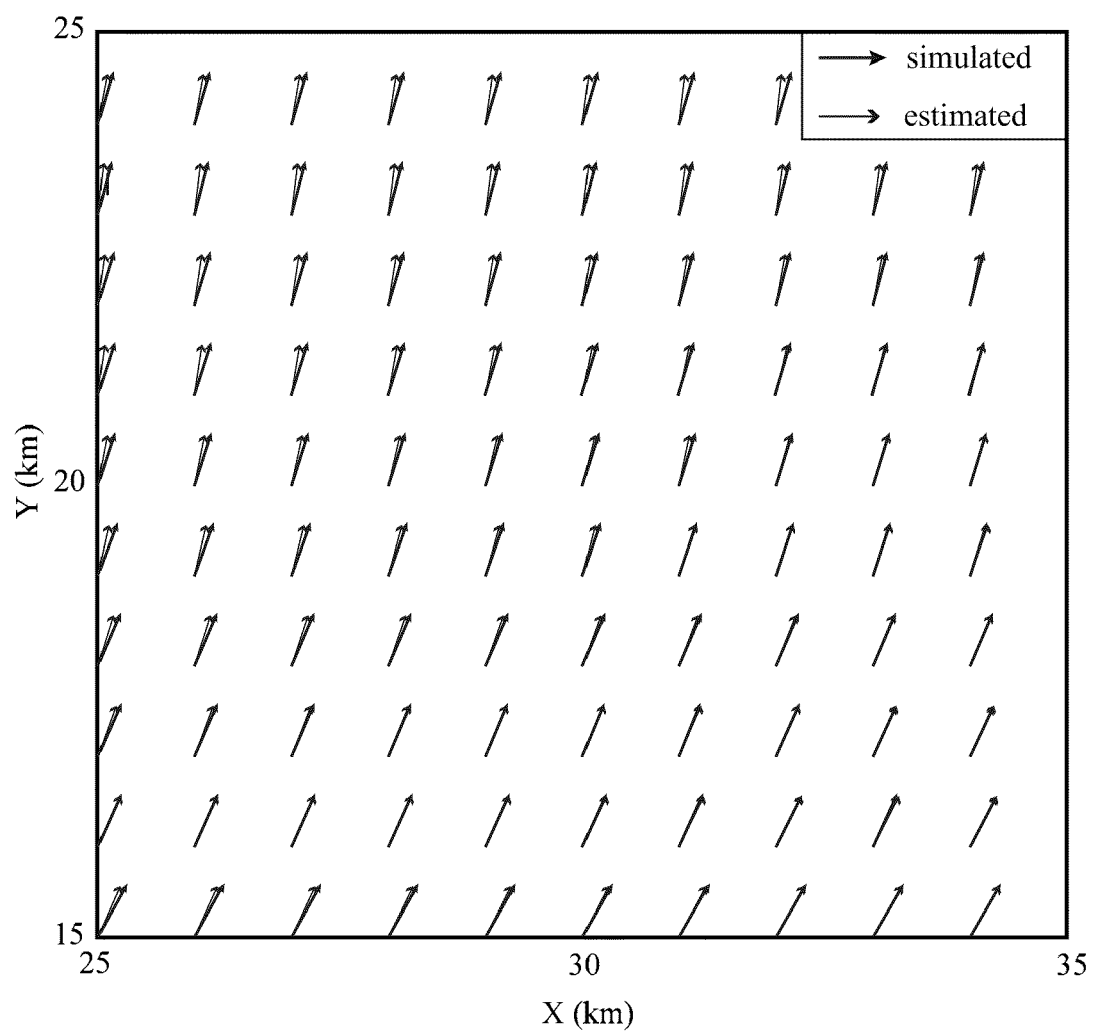
FIG. 6 shows a comparison of the true flow field and the estimated flow field by the spectral algorithm in one portion of the field according to one embodiment of the invention.
Figure 7:
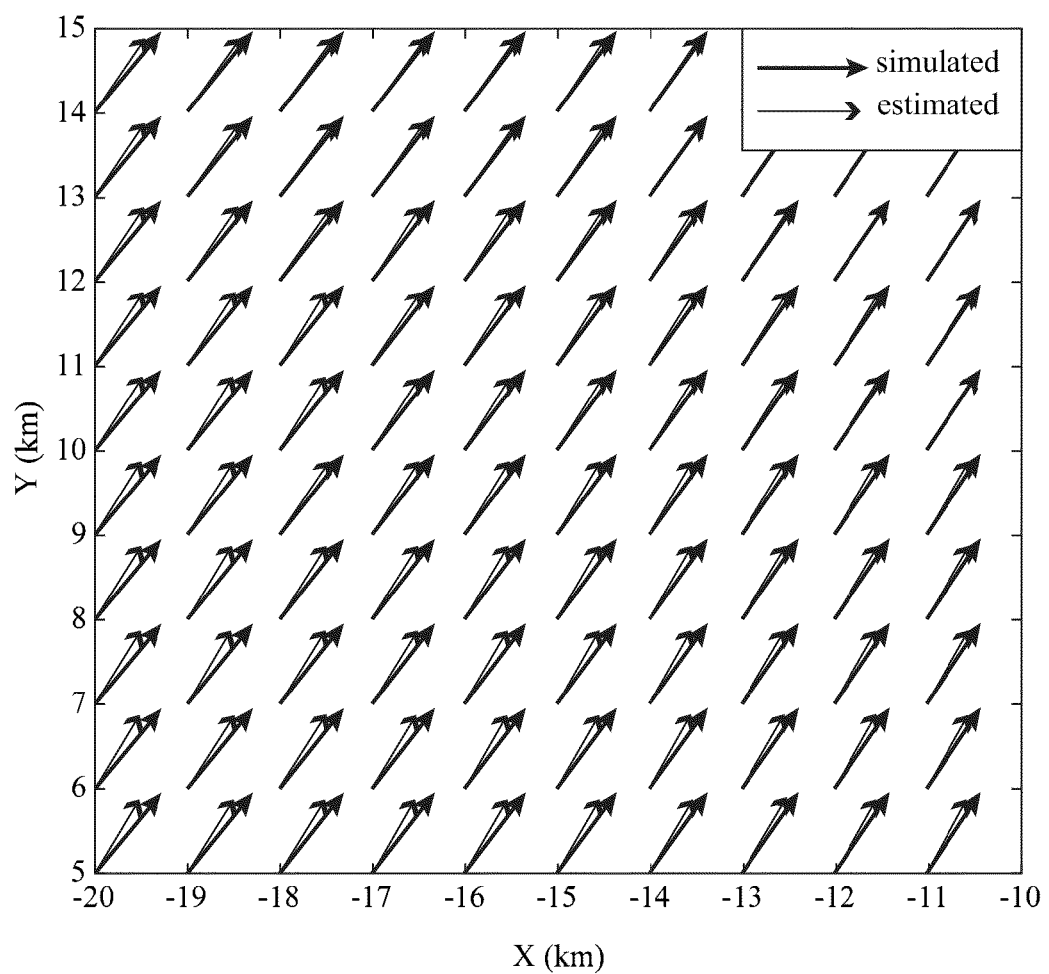
FIG. 7 shows another comparison of the true flow field and the estimated flow field by the spectral algorithm in another portion of the field according to one embodiment of the invention.

FIG. 5 shows a comparison of the true simulated motion field and the estimated motion field using the spectral algorithm applied to the synthesized images sequence. FIG. 6 shows a comparison between the estimated flow field and the true flow field within the data region. These results show that the estimated motion field agrees fairly well with the true flow field within the data region. FIG. 7 shows a comparison between the estimated flow field and the true flow field within the non-data region. The statistics for pixel-by-pixel comparison of flow fields in both x-direction (U-field) and y direction (V-field) are presented in Table 1.

In another embodiment of the invention, a spectral algorithm, such as equation 2, may be implemented in a software library. The library may be written in any programming language, such as C, for its portability. FIG. 2 shows a block diagram for a software implementation for nowcasting using a spectral algorithm according to one embodiment of the invention. A sequence of images is received at block 210. In one embodiment, the images may be received directly from a radar or other scanning system. In another embodiment, the images may be received from storage or memory. Preprocessing may occur on the images to smooth out lines, noise, or distortions. A three-dimensional Fast Fourier Transform (FFT) is applied to the data at block 220. The FFT may be applied using a scientific library, for example, the public domain Fast Fourier Transform of the West (FFTW) library 225. Various other libraries may be use to perform the FFT. The construct system constructs the linear system at block 230. The solver 240 solves the linear equations created by the construct system 230. The solver may use any algorithm to solve the linear equations or inversion techniques. As shown, the solver may solve the linear functions using a user C library 242, a public domain library such as the GNU Scientific Library (GSL C-lib) 244, or a user provided algorithm 246. The retrieve system 250 retrieves two-dimensional discrete Fourier coefficients. An inverse FFT (IFFT) may then be applied to the retrieved data at block 260 to convert the data back into the time domain. Various features may be tracked or forecasts as provided at block 270. And, low pass and/or threshold filtering may also be provided to the data at block 280.

FIG. 3 shows a flowchart of a method for predicting future atmospheric conditions based on reflective atmospheric data according to one embodiment of the invention. Reflective atmospheric data is received at block 310. The data may be received directly from a radar system or from a storage location, such as digitally stored in memory. The flow equation is solved in block 320. The flow equation may be solved in the spectral domain. Accordingly, a FFT and IFFT may be employed to formulate and/or solve the flow equation. Future conditions may be determined based on the results from solving the flow equation at block 330. These results may then be returned to a user through a display or any other format at block 340.

FIGS. 4A-4H show examples of images created from a first synthesized reflectivity sequence (synthesis 1) according to one embodiment of the invention. In this first synthesized reflectivity sequence, a steady motion flow field is generated over a two-dimensional region with the dimensions of −50 km$\leq$x, y$\leq$50 km. A steady motion field is a time independent flow field that does not change with time. In the first synthesized reflectivity sequence the sampling interval is 1 km on both x-axis and y-axis. FIG. 4A is used as the initial observed reflectivity (dBZ) field. A radar image sequence of 80-step span can be generated and a simple passive advection of reflectivity can be simulated for this data set. The initial reflectivity image is evolved by the advection toward the north east corner of the map using the pre-generated steady motion field as shown in FIGS. 4A-4H. The arrows in the figures display the simulated flow field. Synthesis 1 shows a reflectivity field that evolves over time. Two rectangular regions are marked in FIG. 4A. In the non-data region, the reflectivity keeps zero value in all synthesized images, so that the motion pattern never presents within this region. In contrast, as seen in FIGS. 4D-4H, the precipitation field enters and sweeps over the data region.

FIG. 5 shows a comparison of the true simulated motion field and the estimated motion field using the spectral algorithm applied to the synthesized images sequence. FIG. 6 shows a comparison between the estimated flow field and the true flow field within the data region. These results show that the estimated motion field agrees fairly well with the true flow field within the data region. FIG. 7 shows a comparison between the estimated flow field and the true flow field within the non-data region. The statistics for pixel-by-pixel comparison of flow fields in both x-direction (U-field) and y direction (V-field) are presented in Table 1.

Table 1 shows statistics for pixel-by-pixel comparison between estimated flow fields and true flow fields. The unit of flow field velocity is km/step. CORR is the correlation coefficient. NSE is the normalized standard error in percent. SNR is the equivalent signal-to-noise ratio for estimation in dB. The statistics for synthesis 1 is conducted over the whole 2-D map (−50 km$\leq$x, y$\leq$50 km). The statistics for synthesis 2 is conducted over the region near the growth center (5 km$\leq$x, y$\leq$15 km). In synthesis 2, the parameters for S-term, U-field and V-field are the same as those shown in FIG. 5.

TABLE 1

Statistics For Pixel-By-Pixel Comparison Between
Estimated Flow Fields And True Flow Fields

|  |  | Bias | Std. Dev | CORR | NSE (%) | SNR (dB) |
|---|---|---|---|---|---|---|
| U-field |  |  |  |  |  |  |
| Synthesis 1 |  | −0.03 | 0.09 | 0.91 | 16 | 7.37 |
| Synthesis 2 | without S-term | −0.1 | 0.1 | 0.69 | 28 | −8.3 |
|  | with S-term | −0.05 | 0.05 | 0.88 | 15 | −2.79 |
| V-field |  |  |  |  |  |  |
| Synthesis 1 |  | −0.002 | 0.09 | 0.9 | 15 | 7.36 |
| Synthesis 2 | without S-term | −0.09 | 0.1 | 0.93 | 14 | −3.53 |
|  | with S-term | −0.05 | 0.05 | 0.98 | 7 | 1.76 |

Figure 8A:
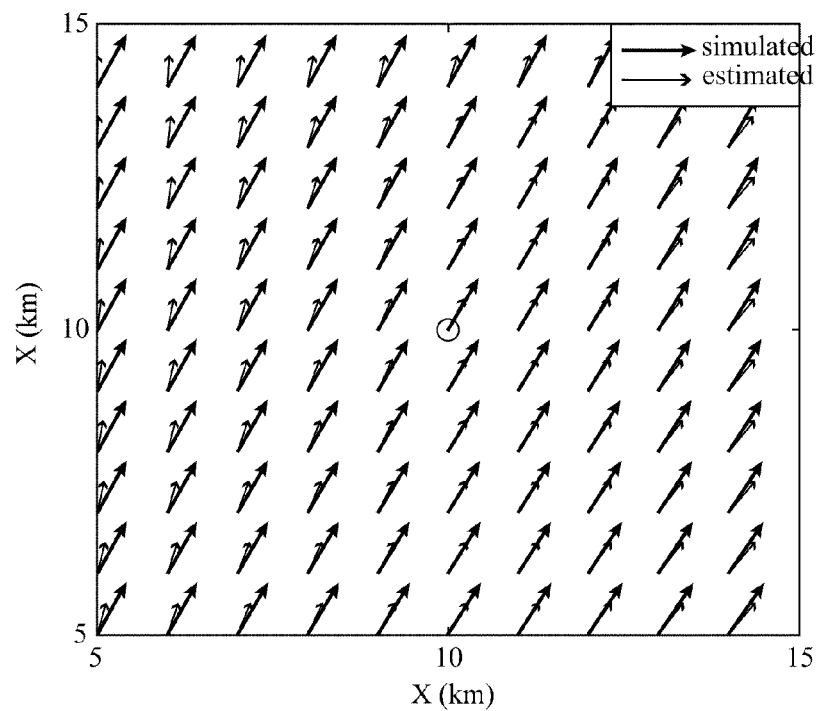
FIG. 8A shows a comparison of the estimated flow field by the spectral algorithm near the growth center without S-term according to one embodiment of the invention.
Figure 8B:
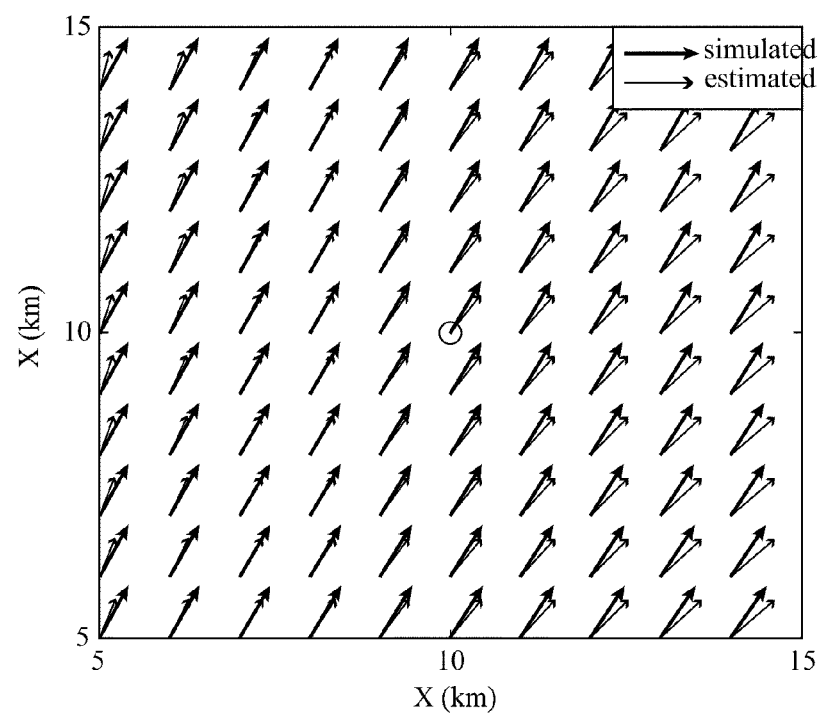
FIG. 8B shows a comparison of the estimated flow field by the spectral algorithm near the growth center with the S-term added according to one embodiment of the invention.
Figure 9A:
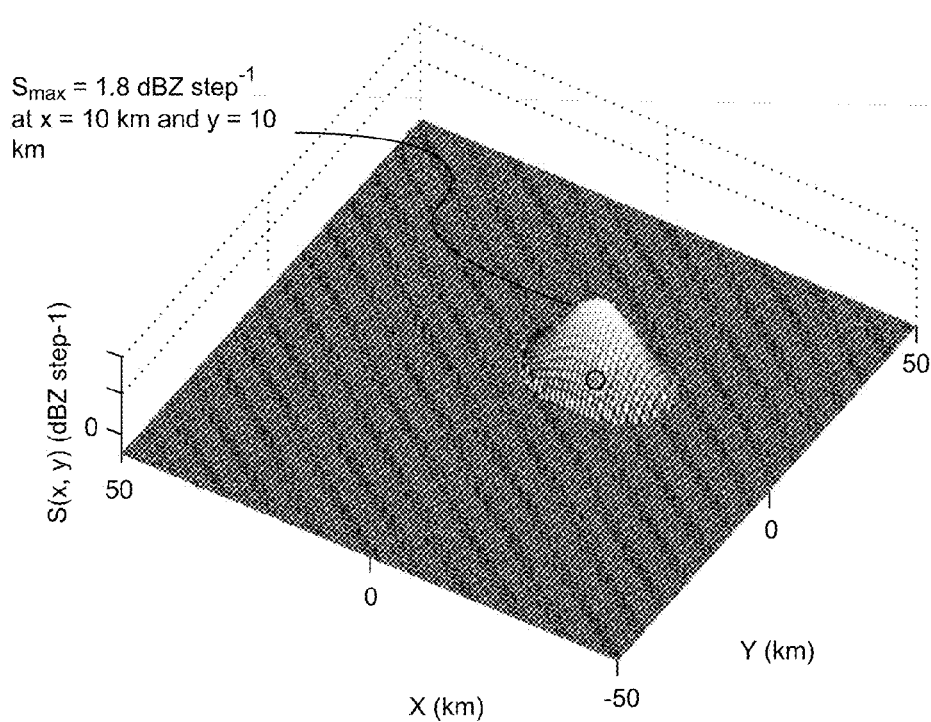
FIG. 9A shows a two-dimensional Gaussian function, which is used to simulate the localized growth mechanism according to one embodiment of the invention.
Figure 9B:
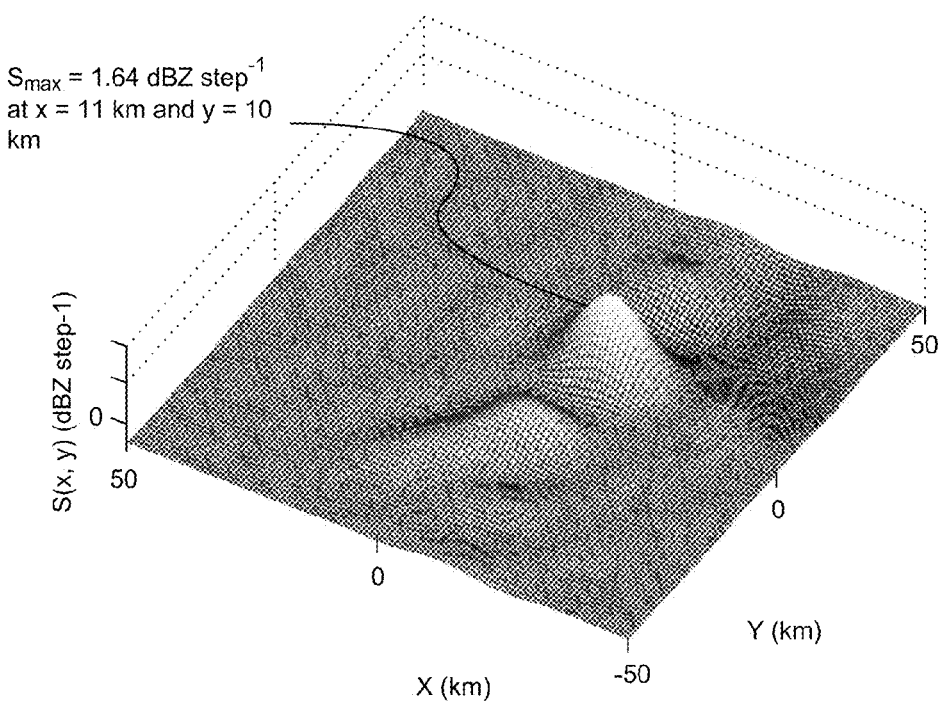
FIG. 9B shows a two-dimensional representation of an estimated S-term using a spectral algorithm according to one embodiment of the invention.

In synthesis 2, a localized steady source is added along with advection terms. Here the term, $S(x, y, t) \equiv S(x, y)$ in equation 1, is interpreted as the growth mechanism ($S(x, y) \geq 0$) that is time-independent and spatially localized. $S(x, y)$ is a Gaussian-shaped source term that is centered at (10 km, 10 km), as shown in FIG. 9A. Two different ways of applying the spectral algorithm to the synthesized reflectivity sequence are compared: 1) S-term is not present in the estimation algorithm, and 2) S-term is present in the estimation algorithm (see equation 2). With the S-term added in the spectral algorithm, significant improvement for the flow field estimation near the region where the growth mechanism presents is gained as shown in FIGS. 8A and 8B. Quantitative results for the comparison around the growth center (5 km≦x, y≦15 km) are shown in Table 1. The flow field has the larger V-values than U-values around the growth center (5 km≦x, y≦15 km), so the estimation for V-field has the better performance than that for U-field, as shown in Table 1. For the estimation with S-term added, the spectral algorithm is able to identify the growth term $S(x, y)$ as shown in FIG. 9B.

Figure 10:
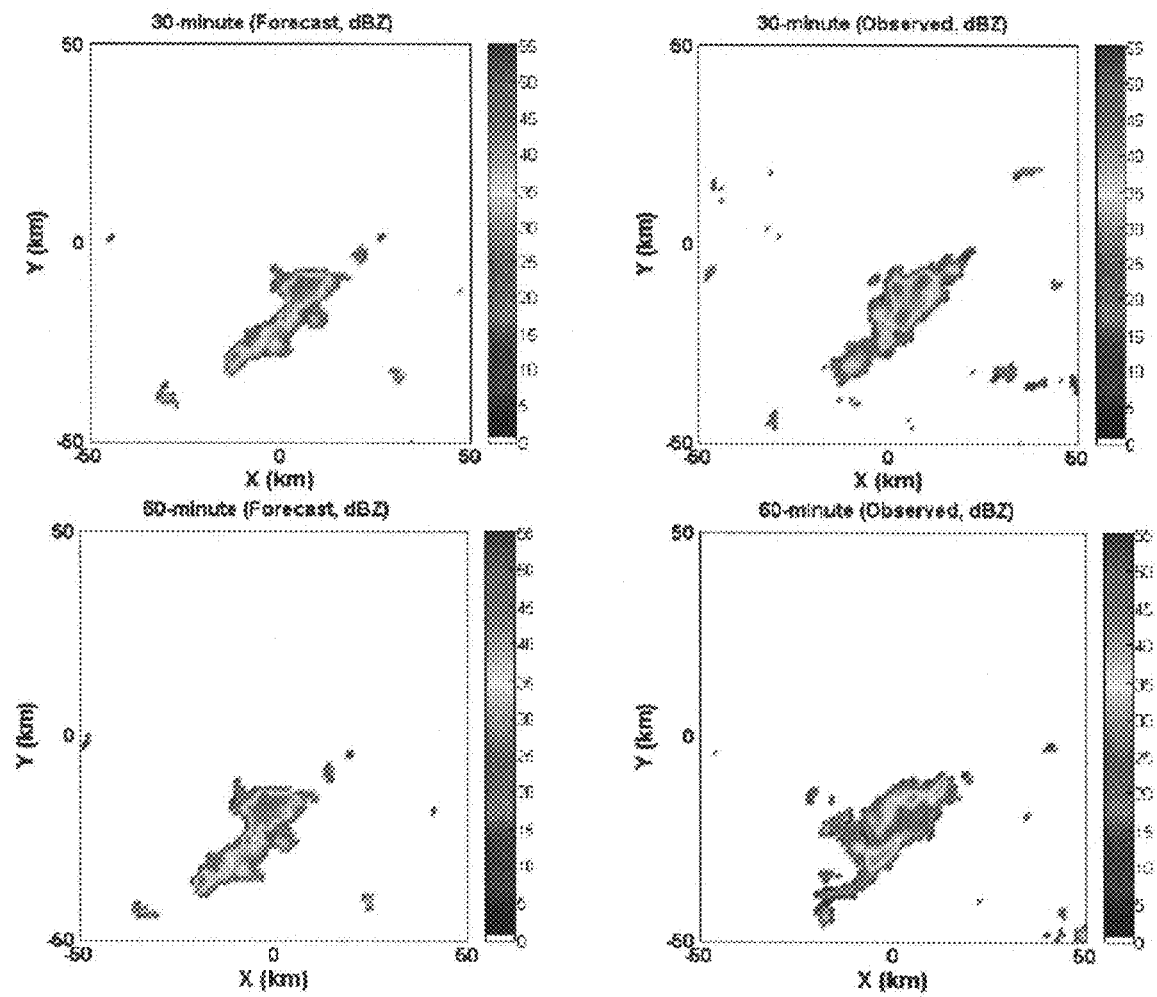
FIG. 10 shows a comparison of forecast reflectivity and observed reflectivity from a WSR-88D radar in Melbourne Fla., for 30 minutes and 60 minutes, based on the motion tracking using the spectral algorithm according to one embodiment of the invention.

To further validate embodiments of the invention, the spectral tracking algorithm has been applied to three sets of observed radar reflectivity (dBZ). The first set of reflectivity data was collected by the WSR-88D radar (Melbourne, Fla.) during the storm event from 2102 UTC 23 August to 0057 UTC 24 Aug., 1998. This temporal sequence of radar images spans approximately 4 hours. The WSR-88D radar takes approximately 5 minutes to finish a volume scan. Each volume of PPI scan was converted to the CAPPI data in Cartesian coordinates. The interpolated 2D radar images at the height of 1 km above the ground are used in this study. The re-sampled radar images are in the two-dimensional region: −50 km≦x≦50 km and −50 km≦y≦50 km. The spatial sampling interval is 1 km on both x-axis and y-axis. The temporal sampling interval is 5 minutes whereas each image is projected onto regular points on time axis. Therefore, a sequence of 48 radar images that are equally sampled on time axis were obtained. The spectral tracking algorithm is applied for each of the 6 consecutive radar images that span 25 minutes. Each estimated motion field is used to extrapolate for the next successive 12 radar images. Therefore, this set provides predicted radar images up to 1 hour. An example of the predicted reflectivity (30 minutes and 60 minutes) compared with the observed reflectivity is shown in FIG. 10.

Figure 11:
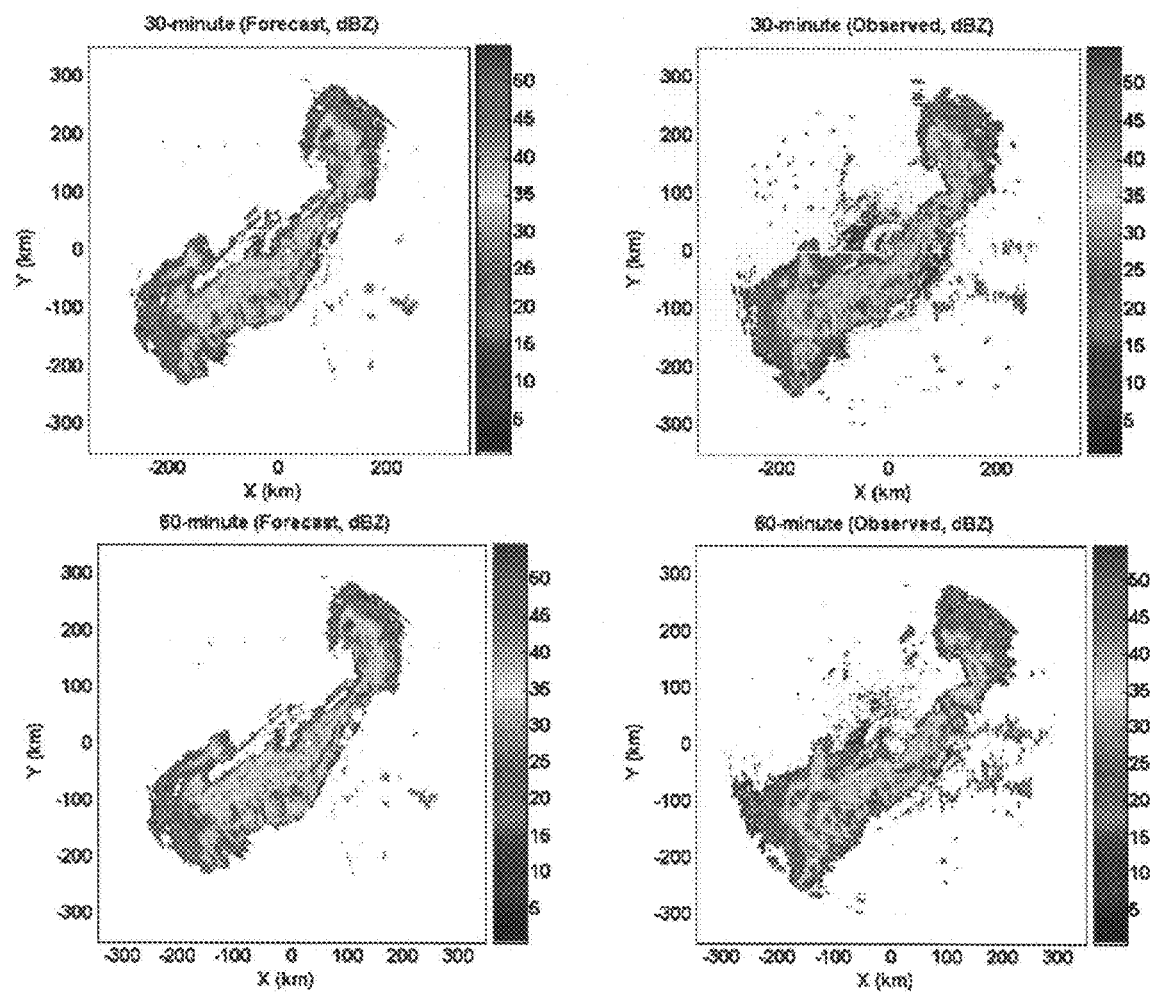
FIG. 11 shows a comparison of forecast reflectivity and observed reflectivity from a KOUN radar in Oklahoma, for 30 minutes and 60 minutes, based on the motion tracking using the spectral algorithm according to one embodiment of the invention.

The second set of reflectivity data was obtained from the KOUN radar (Norman, Okla.) during the storm event from 0340 UTC to 0959 UTC 6 Jun., 2003. This temporal sequence of radar images spans approximately 6 hours, 20 minutes. The KOUN radar takes approximately 6.5 minutes for each volume scan. Each volume of PPI scan was converted to the CAPPI data in Cartesian coordinates. The interpolated 2D radar images at the height of about 1 km to 3 km or more above the ground are used. The re-sampled radar images are in the two-dimensional region: −350 km≦x≦350 km and −350 km≦y≦350 km. The spatial sampling interval is 1 km on both x-axis and y-axis. By projecting each image onto regular temporal points, a sequence of 59 radar images that are equidistantly sampled over time can be obtained. The sampling interval is 6.5 minutes. The spectral tracking algorithm is applied for each of the 6 consecutive radar images that span approximately 30 minutes. Each estimated motion field is used to extrapolate for the next successive 9 radar images. This gives us predicted radar images up to approximately 1 hour. An example of the predicted reflectivity (30 minutes and 60 minutes) compared with the observed reflectivity is shown in FIG. 11.

Figure 12:
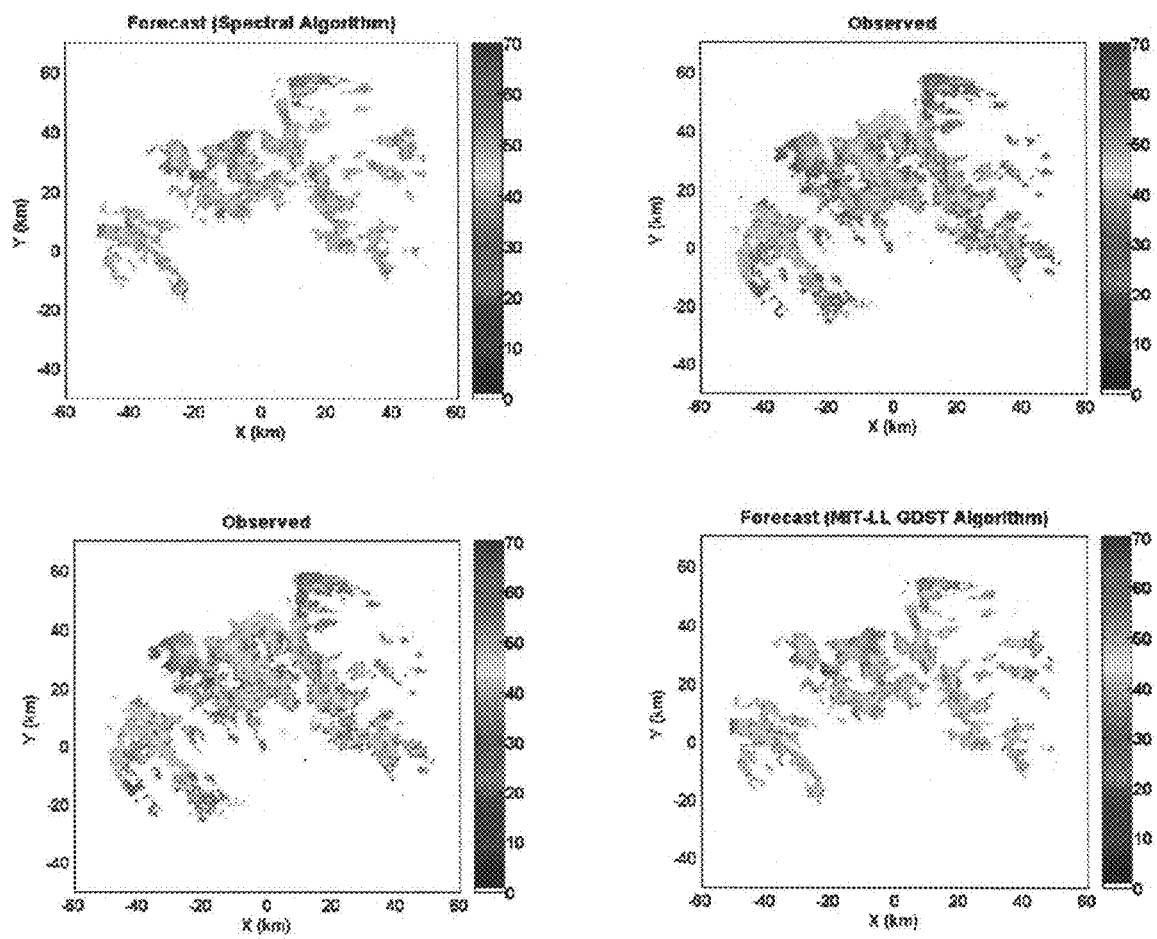
FIG. 12 shows a comparison of forecast reflectivity and observed reflectivity from the four-radar network in Oklahoma (CASA IP1), for 5 minutes, based on the motion tracking using the spectral algorithm according to one embodiment of the invention.

The third set of reflectivity images was collected and merged from the four-radar network in the CASA IP1 project. The four radars of CASA IP1 are located at Chickasha (KSAO), Cyril (KCYR), Lawton (KLWE), and Rush Springs (KRSP) in Oklahoma. These are X-band (3-cm) radars, each of which has a beam width of 1.8 degree and a range of 30 km. The reflectivity has been corrected to compensate the path integrated attenuation. The data from the CASA IP1 project has much higher spatial and temporal resolutions. The sequence of radar images spans approximately 48 minutes (00:10 UTC–00:57 UTC, Aug. 27, 2006), and the temporal resolution is approximately 30 seconds. We therefore have 95 successive images in total. The storm event was associated with a cold front and flash flood warnings were issued. PPI scans are converted to the CAPPI data in Cartesian coordinates. The interpolated 2D radar images at the height of 2.5 km above the ground are used for this study. The re-sampled radar images are in the two-dimensional region: −60 km≦x≦60 km and −50 km≦y≦70 km. The coordinate origin is at the center of four CASA radars. The spatial sampling resolution is 0.5 km on both x-axis and y-axis. The spectral tracking algorithm is applied for each of the 25 consecutive radar images that span approximately 12.5 minutes. Each estimated motion field is used to extrapolate for the next successive 10 radar images. Subsequently, this gives us the predicted radar images for five minutes. An example of the predicted reflectivity fields (5 min) compared with the observed reflectivity field is shown in FIG. 12.

The following scores have been adopted to evaluate the forecasting performance. The critical success index (CSI) is defined by $$CSI \equiv \frac{a}{a+b+c}; \qquad \text{eq. 3}$$

The probability of detection (POD) is defined by $$POD \equiv \frac{a}{a+b}; \qquad \text{eq. 4}$$

The false alarm rate (FAR) is defined by $$FAR \equiv \frac{c}{a+c};  \quad \text{eq. 5}$$

where "a" is the number of correct detection of occurring event, "b" is the number of missed detection of occurring event, and "c" is the number of false detection of nonoccurring event. Hereafter the rain event is defined as a reflectivity (dBZ) value, on the neighboring region of specified size, and is found to be larger than the given threshold reflectivity value.

Figure 13A:
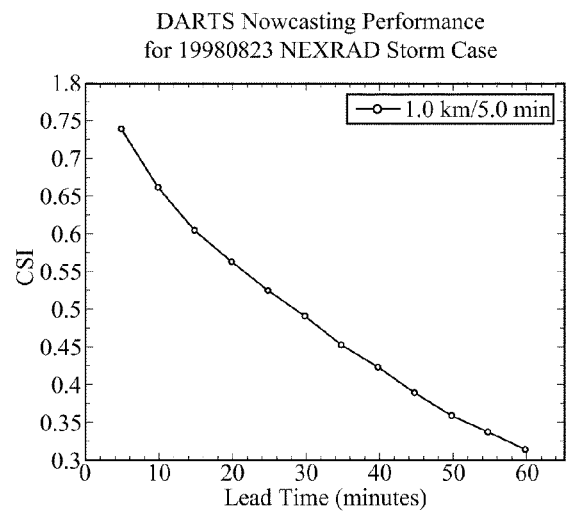
FIGS. 13A-13C show exemplary nowcasting scores for observed radar data collected by the WSR-88D radar in Florida according to one embodiment of the invention.
Figure 13B:
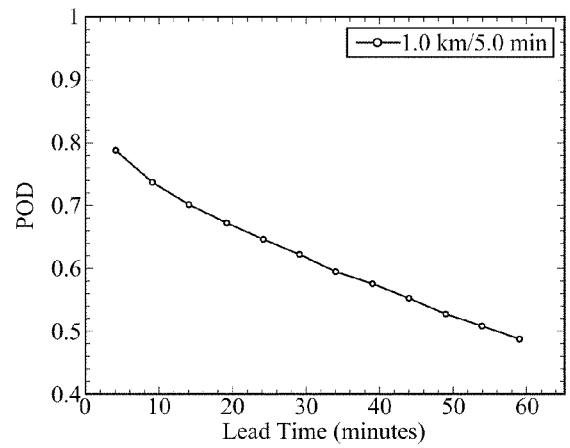
Figure 13C:
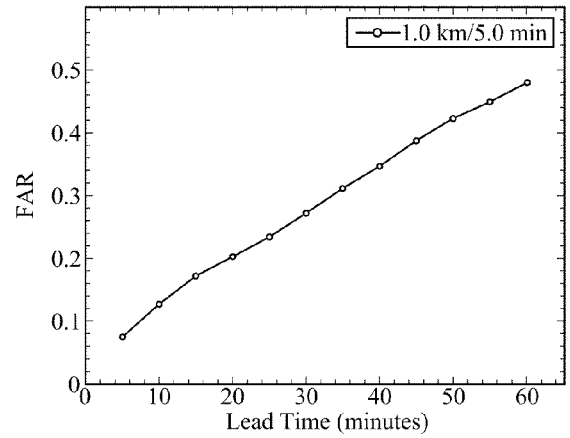
Figure 14A:
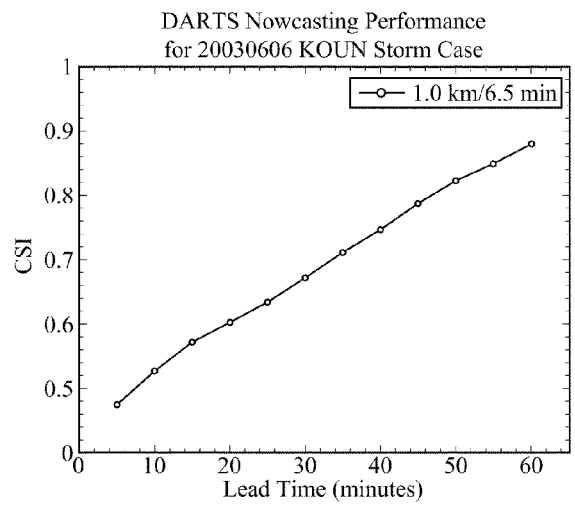
FIGS. 14A-14C show exemplary nowcasting scores for observed radar data collected by the KOUN radar in Oklahoma according to one embodiment of the invention.
Figure 14B:
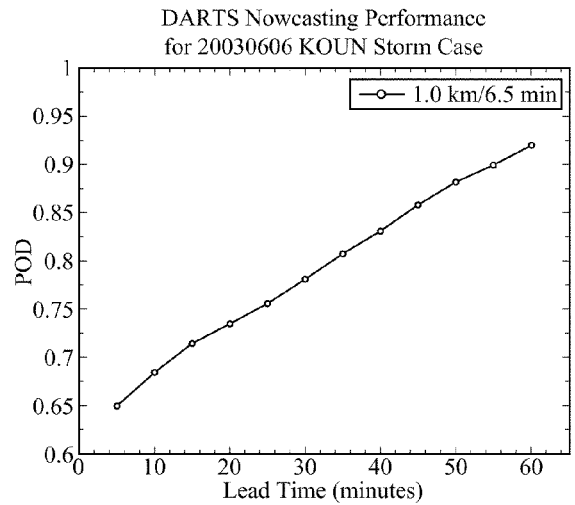
Figure 14C:
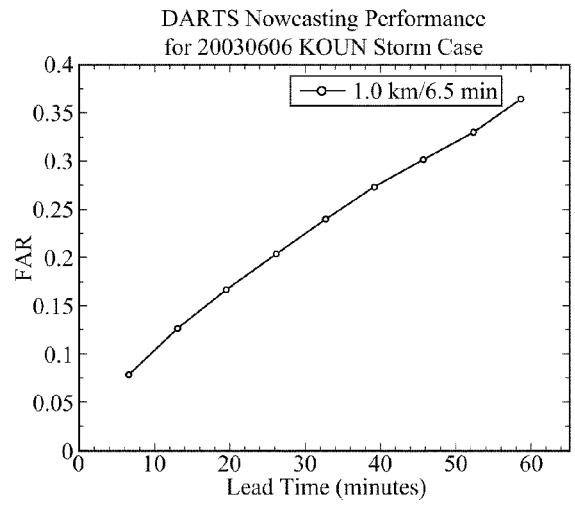
Figure 15A:
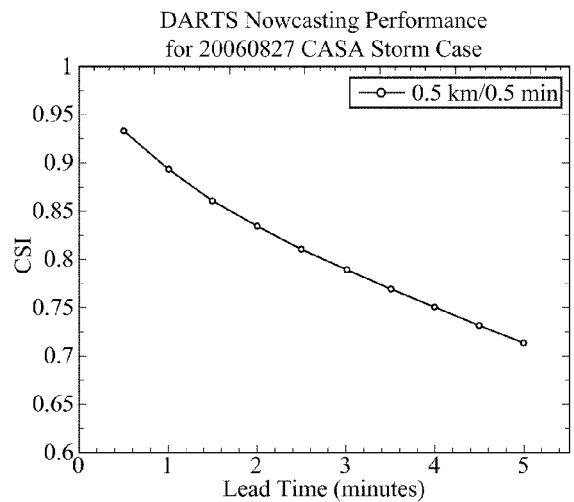
FIGS. 15A-15C show a set of nowcasting scores for observed reflectivity data collected and merged from a four-radar network according to one embodiment of the invention.
Figure 15B:
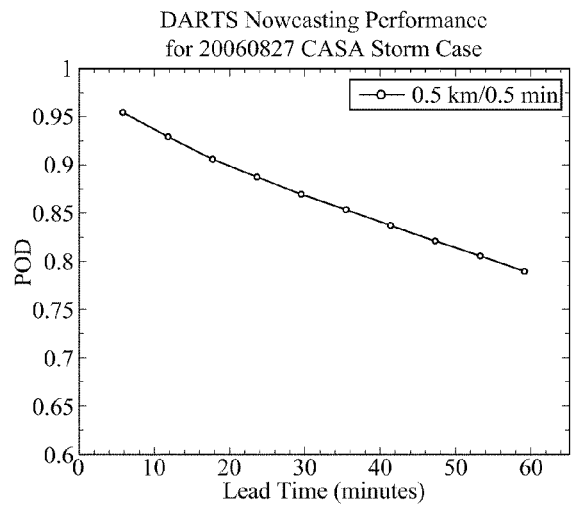
Figure 15C:
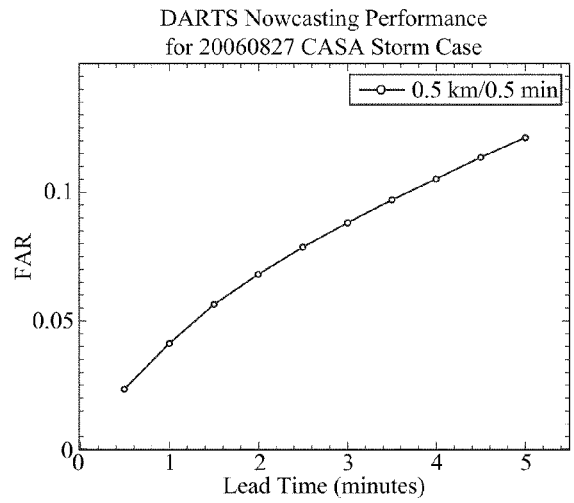

These scores are computed on a neighboring region of 4 km×4 km grids, with one level of reflectivity threshold (for example, 25 dBZ), for the data from the WSR-88D radar (Melbourne, Fla.) and the KOUN radar (Norman, Okla.). For the data set from the four radar network (CASA IP1) in Oklahoma, the forecast scores are computed on a neighboring region of 2 km×2 km grids, with one level of reflectivity threshold (30 dBZ). Results are shown in FIGS. 13A-13C for the WSR-88D radar data at Melbourne, FIGS. 14A-14C for the KOUN radar data, and FIGS. 15A-15C show nowcasting scores for the CASA EP1 data, where the forecasting scores are averaged over all predictions of the same lead time.

To further evaluate the effect of sampling resolution on the nowcasting performance of the spectral algorithm, the spectral algorithm has been applied to another set of CASA IP1 observed reflectivity that were down-sampled into various spatial resolutions and temporal resolutions. The sequence of radar images spans approximately 113 minutes (22:50 UTC August 15-00:44 UTC, Aug. 16, 2006), and the native temporal resolution is approximately 30 seconds. A total of 225 successive images are in the sequence. PPI scans are interpolated and merged to generate the CAPPI data in Cartesian coordinates. The interpolated 2D radar images at the height of 2.5 km above the ground are used. The re-sampled radar images are in the two-dimensional region: $-60 \text{ km} \leq x \leq 60$ km and $-50 \text{ km} \leq y \leq 70$ km. The origin of coordinates is at the center of four CASA radars. To study the effect of different sampling resolutions, two sets of re-sampled reflectivity sequences are obtained. In the first set of reflectivity sequences, the temporal resolution is fixed by 30 seconds and the spatial resolutions of re-sampled reflectivity images are 0.5 km and 1.0 km respectively. In the second set of reflectivity sequences, the spatial resolution is fixed by 0.5 km and the temporal resolutions of re-sampled reflectivity sequences are 30 seconds, 1 minute, 2 minutes and 3 minutes respectively. For each re-sampled reflectivity sequence, the historical images in the last 12 minutes are used for the motion estimation and the estimated motion field is applied to forecasting the reflectivity images in the next 30 minutes. The nowcasting scores are averaged over all predictions of the same lead time.

Figure 16A:
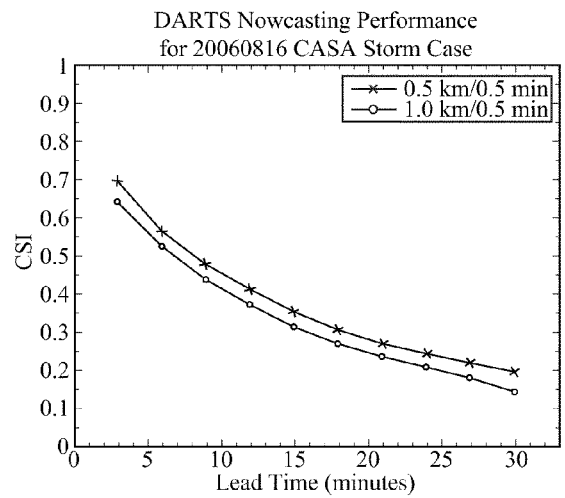
FIGS. 16A-16C show another set of nowcasting scores for observed reflectivity data collected and merged from the four-radar network according to one embodiment of the invention.
Figure 16B:
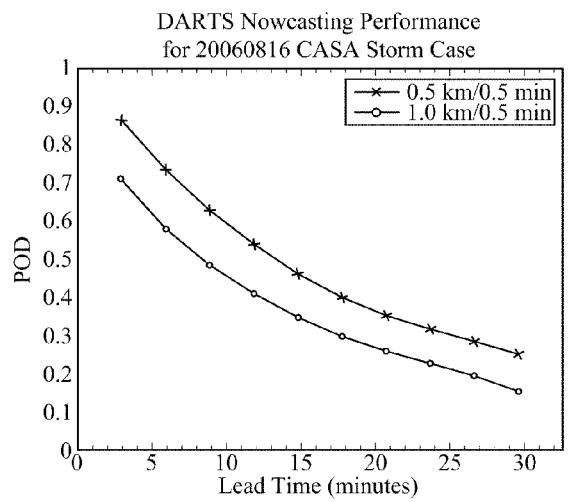
Figure 16C:
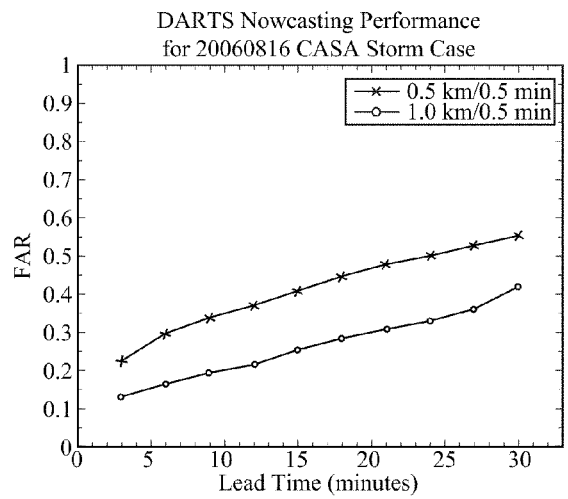

For the first set of reflectivity sequences, 30-minute forecasts are conducted using the spectral tracking algorithm. Results are shown in FIGS. 16A-16C computed on a neighboring region of 4 km×4 km grids. These results reveal that the higher spatial resolution can improve the storm tracking as shown in CSI. The increased samples with higher spatial resolution provide better prediction of the storm location with increased POD. The FAR is larger with higher spatial resolution for this case; however, most of the false detection occurs at the storm edges.

For the second set of reflectivity sequences, 30-minute forecasts are conducted using the spectral tracking algorithm.

Figure 17A:
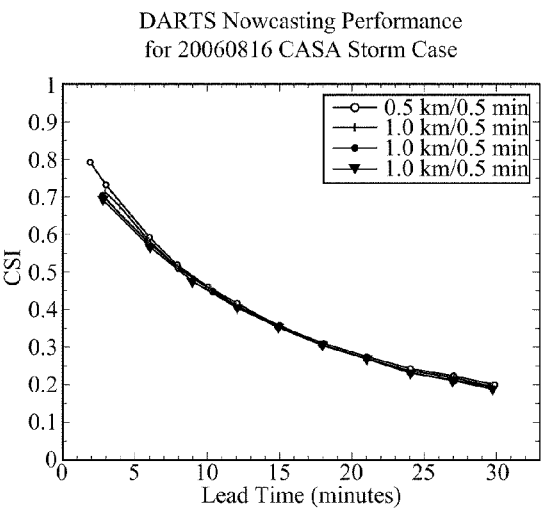
FIGS. 17A-17C show nowcasting scores for observed reflectivity data collected and merged from the four-radar network over a 3-minute period according to one embodiment of the invention.
Figure 17B:
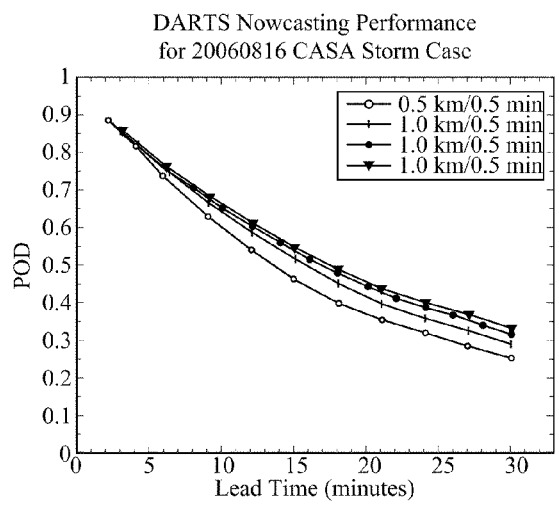
Figure 17C:
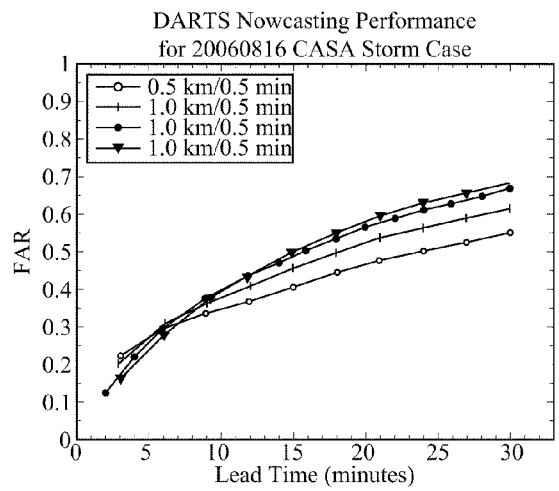
Figure 18A:
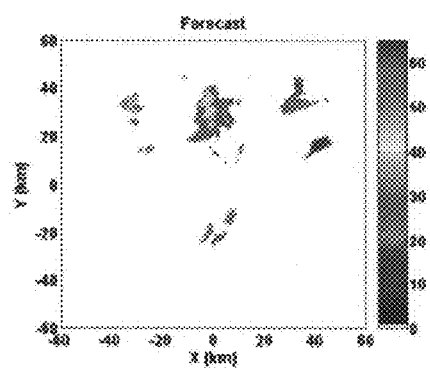
FIGS. 18A-18H show examples of 5-step (2.5-minute) forecast images compared with the observed images in real-time simulations according to one embodiment of the invention.
Figure 18B:
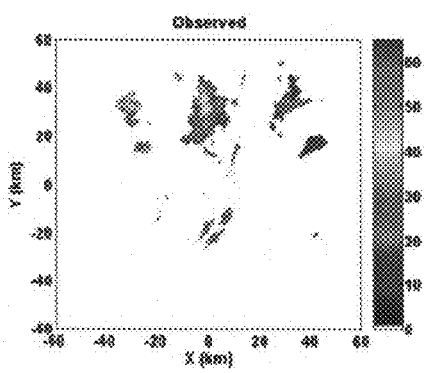
Figure 18C:
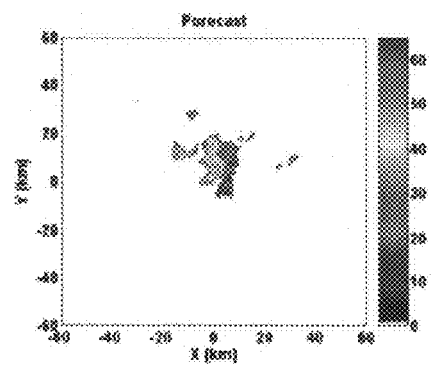
Figure 18D:
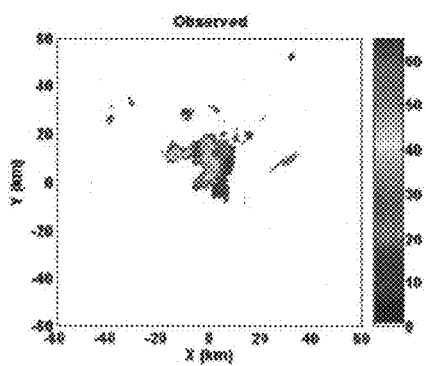
Figure 18E:
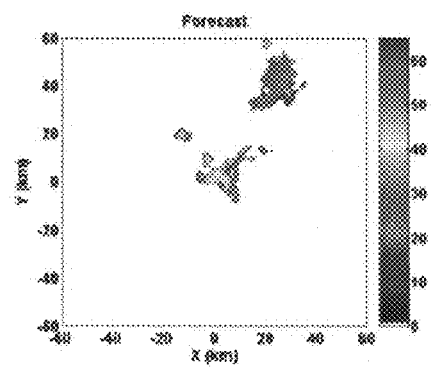
Figure 18F:
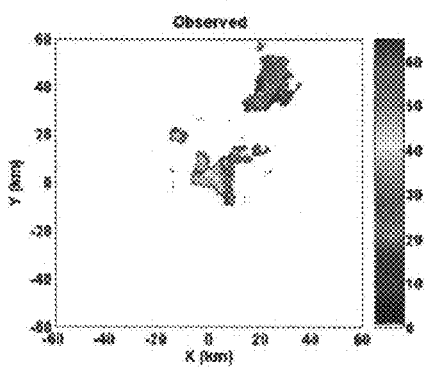
Figure 18G:
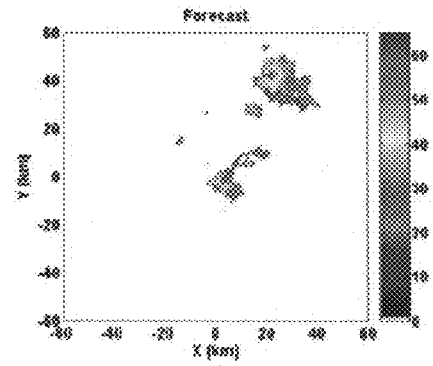
Figure 18H:
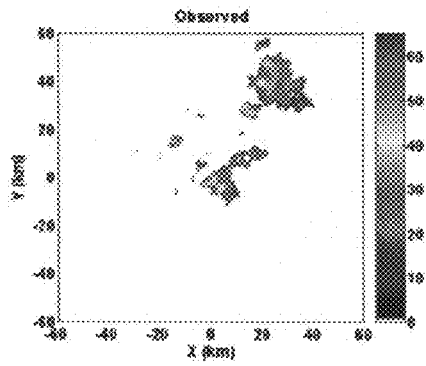
Figure 19A:
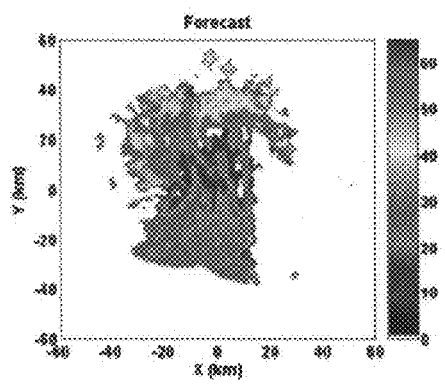
FIGS. 19A-19H show more examples of 5-step (2.5-minute) forecast images compared with the observed images in real-time simulations according to one embodiment of the invention.
Figure 19B:
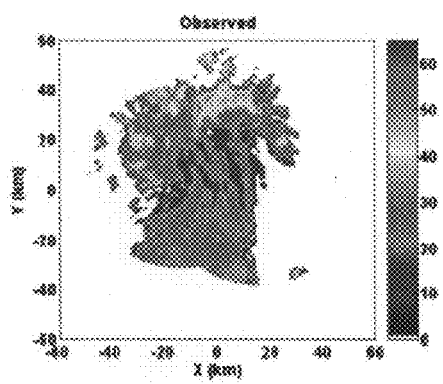
Figure 19C:
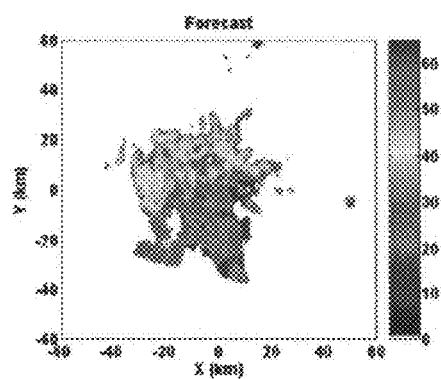
Figure 19D:
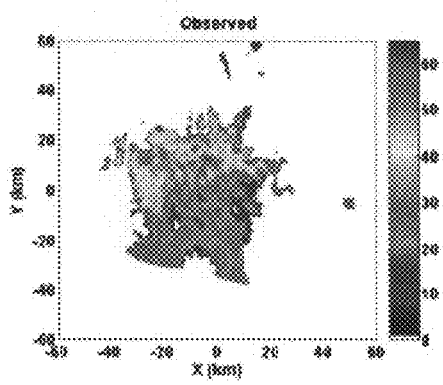
Figure 19E:
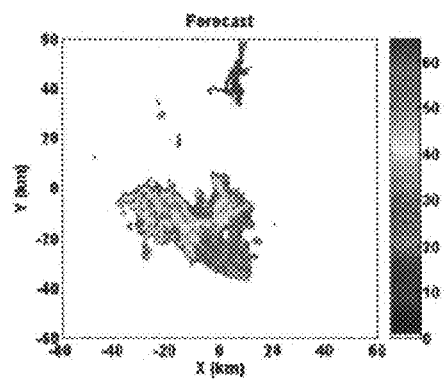
Figure 19F:
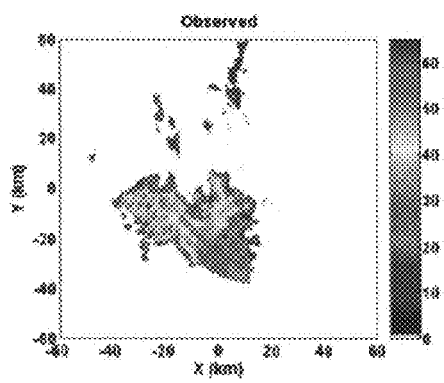
Figure 19G:
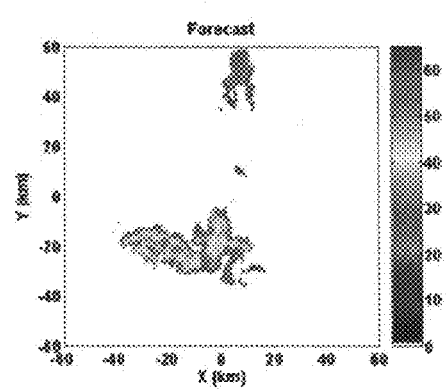
Figure 19H:
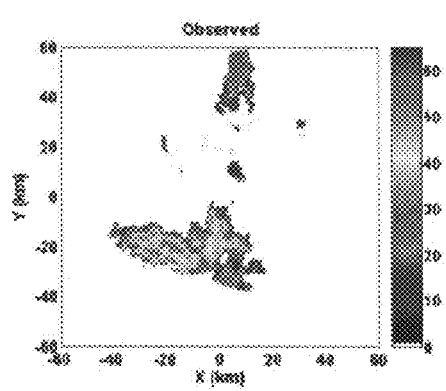

Results are shown in FIGS. 17A-17C. It is seen that as the temporal resolution changes from 30 seconds to 3 minutes, the false alarm rate consistently increases for the spectral algorithm. The detection rate (POD) slightly and consistently increases when the resolution changes from 0.5 minutes to 3 minutes. Overall same CSI scores are achieved, implying all the temporal resolutions sufficient to follow the temporal variability of this storm.

The first test of embodiments of the present invention was conducted using the reflectivity data collected by the WSR-88D radar (Melbourne, Fla.) during the storm event from 2102 UTC 23 August to 0057 UTC 24 Aug., 1998. The WSR-88D radar takes approximately five minutes for each volume scan. Each volume of PPI scan is interpolated for generating the CAPPI data in Cartesian coordinates. The interpolated 2D radar images at the height of 1 km above the ground are used in this study. The re-sampled radar images are in the two dimensional region: $-50 \text{ km} \leq x \leq 50$ km and $-50 \text{ km} \leq y \leq 50$ km. The WSR-88D radar is located at the origin of Cartesian coordinates. The spatial sampling interval is 1 km on both x-axis and y-axis. The temporal sampling interval is 5 minutes. The spectral tracking algorithm is applied for each of the six consecutive radar images that span approximately twenty-five minutes. The estimated motion field is used to track and forecast next twelve reflectivity images. This gives us predicted images up to one hour. Each image size is 101×101 pixels. The CPU clock time for each component of the system and total CPU time for each complete loop run are shown in Table 2.

TABLE 2

| CPU Time For The Testing Run Of Software On Reflectivity Data From The WSR-88D | |
|---|---|
| Component | CPU Time (seconds) |
| 3D FFT | 0.037 |
| System Construction | 0.037 |
| System Solver | 6.302 |
| System Retrieval | 0.002 |
| Inverse FFT (2D and 3D) | 0.003 |
| Tracking and Forecasting | 5.016 |
| Total | 11.397 |

The second test of embodiments of the present invention is conducted using the reflectivity data collected and merged from the four-radar network in the CASA IP1 project. The four radars of CASA IP1 are located at Chickasha (KSAO), Cyril (KCYR), Lawton (KLWE), and Rush Springs (KRSP) in Oklahoma. These are the X-band (3-cm) radars, each of which has a beam width of 1.8 degree and a range of 30 km. The reflectivity has been corrected to compensate the path-integrated attenuation. The storm data spans approximately forty-eight minutes (00:10 UTC-00:57 UTC, Aug. 27 in 2006). Each volume of PPI scans is interpolated for generating the CAPPI data in Cartesian coordinates. The interpolated 2D radar images at the height of 2.5 km above the ground are used in this study. The re-sampled radar images are in the two-dimensional region: $-60 \text{ km} \leq x \leq 60$ km and $-50 \text{ km} \leq y \leq 70$ km. The coordinate origin is the center of the four CASA radars. The spatial sampling resolution is 0.5 km on both x-axis and y-axis. The temporal resolution is approximately 30 seconds. The spectral tracking algorithm is applied for each of the 25 consecutive radar images that span approximately 12.5 minutes. Each estimated motion field is used to track and forecast next ten reflectivity images. This gives us predicted radar images for five minutes. Each image size is 241×241 pixels. The CPU clock time for each component of the system and total CPU time for each complete loop run are shown in Table 3.

TABLE 3

CPU Time For The Testing Run Of Software On Reflectivity Data From The CASA IP1 Radar Network (OK 2006): Time Is Averaged Over 61 Processing Loops

| Component | CPU Time (seconds) |
| --- | --- |
| 3D FFT | 0.225 |
| System Construction | 0.039 |
| System Solver | 3.699 |
| System Retrieval | 0.006 |
| Inverse FFT (2D and 3D) | 0.020 |
| Tracking and Forecasting | 17.360 |
| Total | 21.349 |

To further study the feasibility of the real-time application of a DARTS based system, the continuous radar scanning, data pre-processing and storm tracking and nowcasting are simulated. Two sets of reflectivity data from the CASA IP1 project (OK, 2006) are used in the simulations. The first dataset spans approximately twelve hours (00:00 UTC-12:21 UTC, Aug. 27, 2006). The second dataset spans four hours and forty-four minutes (22:00 UTC, Aug. 15, 2006-02:44 UTC, Aug. 16, 2006). Because the data were collected by short-range (30 km) network radars, the data pre-processing includes synchronizing and merging volume scans as well as interpolating volume scans. The two-dimensional reflectivity images of 2.5 km height above the ground are used as the input to DARTS system. The reflectivity values are corrected to compensate the integral path attenuation. The spatial resolution is 0.5 km×0.5 km. The temporal resolution is around 30 seconds. The 10-step nowcast (5 minutes) in a single loop takes approximately 21 seconds. During each volume scan, 25 of the most recent images are used for the motion estimation and tracking. For the two datasets that are chosen, some volumes are missing and these volume gaps are sporadic. This is handled according to the following strategy: 1) The DARTS tracking and nowcasting are turned on when the most recent 25 history images are all available, which span approximately 12.5 minutes. 2) When one of the five predicted reflectivity images is missing, the most recent nowcast image is used to make the missing image available.

Based on the above strategy, the volume gaps of radar scanning could be completely filled once the DARTS system is turned on. However, this strategy is proposed for handling sporadic volume gaps, since the tracking and nowcasting would be inaccurate if too many radar scans are missing in operations. An alternative strategy for handling the large volume gap is to set a criterion for the gap-filling ratio in the most recent 25 images, and the DARTS system is turned off once the ratio is beyond the specified ratio. The above simple strategy is applied in current simulations.

The dynamic simulation consists of three major components: 1) radar scan sequence emulator; 2) data pre-processing system; and 3) DARTS tracking and nowcasting system. In the radar scanning emulator, a timer is used for continuously monitoring and depositing the reflectivity data. All the timing information has been pre-extracted from each radar volume to a precision of one second. All radar volume files are stored in the NetCDF (network Common Data Form) Format. When the volume scans from all radars in the network are ready, the volume data are synchronized, merged and interpolated to generate the two-dimensional image at 2.5 km height. The generated reflectivity images are also stored in the NetCDF files and a message is sent to invoke the DARTS system. The third component implements the user interface for the DARTS library that is described in FIG. 2. The DARTS system computes the motion estimation for the 5-step tracking and nowcasting and then waits for the next image input.

The simulations are run on a dual-processor computer of medium computational power. Using the two datasets described above, simulations for the radar scanning, the data pre-processing and the DARTS are successfully run over the whole periods that data spans. It is observed that the radar volume scanning interval ranges from 25 to 30 seconds or more, while the data pre-processing time ranges from 4 to 8 seconds and the DARTS nowcasting time ranges from 9 to 15 seconds. All loops for the 5-step tracking and nowcasting based on the DARTS system can be completed during the radar scanning intervals. These simulations are based on the high-resolution reflectivity data over more than sixteen hours. They demonstrate that the DARTS system can be implemented for real-time operational applications. It is also shown that DARTS is a robust system for real-time applications. The examples of predicted images (2.5-minute) that are compared with the observed images are shown in FIGS. 18A-18H and FIGS. 19A-19H.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented in hardware and/or software using scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for predicting atmospheric conditions, the method comprising:
   receiving reflective atmospheric data;
   solving a flow equation for motion coefficients using the reflective atmospheric data, wherein the flow equation comprises a frequency domain flow equation;
   predicting future atmospheric conditions using the motion coefficients and the reflective atmospheric data; and
   returning the predicted future atmospheric conditions.

2. The method according to claim 1, wherein the reflective atmospheric data comprises a time series of sequential radar images.

3. The method according to claim 1, wherein the flow equation comprises a frequency domain flow equation.

4. The method according to claim 3, wherein the frequency domain flow equation comprises:

$$k_t F_{DFT}(k_x, k_y, k_t) =$$

$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right](k_x - k_x')DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right](k_y - k_y')DFT(k_x - k_x', k_y - k_y', k_t) -$$

$$\left(\frac{i}{2\pi}\right)[T_t \cdot S_{DFT}(k_x, k_y, k_t)].$$

5. The method according to claim 1, wherein the estimating further comprises using a least squares error algorithm.

6. A method for predicting a storm motion field; the method comprising:
   propagating a radar signal to the region of interest;
   collecting sampled time domain radar data scattered within the region of interest;
   converting the time domain radar data into the frequency domain;
   solving a frequency domain flow equation for motion coefficients using the reflective atmospheric data;
   predicting future atmospheric conditions using the motion coefficients and the reflective atmospheric data; and
   returning the predicted future atmospheric conditions.

7. The method according to claim 6, wherein the frequency domain flow equation comprises:

$$k_t F_{DFT}(k_x, k_y, k_t) =$$

$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right](k_x - k_x')DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right](k_y - k_y')DFT(k_x - k_x', k_y - k_y', k_t) -$$

$$\left(\frac{i}{2\pi}\right)[T_t \cdot S_{DFT}(k_x, k_y, k_t)].$$

8. The method according to claim 6, further comprising estimating future atmospheric conditions by applying the motion coefficients to the received reflective atmospheric data.

9. The method according to claim 6, wherein the estimating further comprises using a least squares error algorithm.

10. A radar system for nowcasting weather patterns within a region of interest, the system comprising:
    a radar source configured to propagate a radar signal;
    a radar detector configured to collect radar data; and
    a computational system in communication with the radar source and with the radar detector, the computational system comprising a processor and a memory coupled with the processor, the memory comprising a computer-readable medium having a computer-readable program embodied therein for direction operation of the radar system to investigate the region of interest, the computer-readable program including:
       instructions for propagating the radar signal into the region of interest with the radar source;
       instructions for collecting sampled time domain radar data scattered within the region of interest with the radar detector;
       instructions for converting the time domain radar data into frequency domain data;

instructions for solving a frequency domain flow equation for motion coefficients using the reflective atmospheric data; and instructions for predicting future atmospheric conditions using the motion coefficients and the reflective atmospheric data.

11. The radar system according to claim 10, wherein the frequency domain flow equations comprises:

$$k_t F_{DFT}(k_x, k_y, k_t) =$$

$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right] (k_x - k_x') DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right] (k_y - k_y') DFT(k_x - k_x', k_y - k_y', k_t) -$$

$$\left(\frac{i}{2\pi}\right)[T_t \cdot S_{DFT}(k_x, k_y, k_t)].$$

12. A radar system for nowcasting weather patterns within a region of interest, the system comprising:

a radar source configured to propagate a radar signal;

a radar detector configured to collect radar data; and a computational system in communication with the radar source and with the radar detector, the computational system comprising a processor and a memory coupled with the processor, the memory comprising a computer-readable medium having a computer-readable program embodied therein for direction operation of the radar system to investigate the region of interest, the computer-readable program including:

means for propagating the radar signal into the region of interest with the radar source;

means for collecting sampled time domain radar data scattered within the region of interest with the radar detector;

means for converting the time domain radar data into frequency domain data;

means for solving a frequency domain flow equation for motion coefficients using the reflective atmospheric data; and means for predicting future atmospheric conditions using the motion coefficients and the reflective atmospheric data.

* * * * *

UNITED STATES PATENT AND TRADEMARK OFFICE
CERTIFICATE OF CORRECTION

| | | |
|---|---|---|
| PATENT NO. | : 7,843,378 B2 | Page 1 of 1 |
| APPLICATION NO. | : 12/074511 | |
| DATED | : November 30, 2010 | |
| INVENTOR(S) | : Chandrasekaran Venkatachalam et al. | |

It is certified that error appears in the above-identified patent and that said Letters Patent is hereby corrected as shown below:

In the Detailed Description of the Invention

Column 11, Line 25, please delete "EP1" and insert --IP1--

Signed and Sealed this
First Day of February, 2011

David J. Kappos
*Director of the United States Patent and Trademark Office*